United States Patent
Saito

(10) Patent No.: US 7,041,735 B2
(45) Date of Patent: May 9, 2006

(54) VINYL CHLORIDE POLYMER COMPOSITION

(75) Inventor: Hidekazu Saito, Okayama (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 10/484,259

(22) PCT Filed: Jul. 9, 2002

(86) PCT No.: PCT/JP02/06929

§ 371 (c)(1),
(2), (4) Date: Jan. 20, 2004

(87) PCT Pub. No.: WO03/008498

PCT Pub. Date: Jan. 30, 2003

(65) Prior Publication Data

US 2004/0171751 A1    Sep. 2, 2004

(30) Foreign Application Priority Data

Jul. 19, 2001 (JP) ............... 2001-219650
Aug. 22, 2001 (JP) ............... 2001-251828
Aug. 23, 2001 (JP) ............... 2001-252938

(51) Int. Cl.
*C08L 27/06* (2006.01)
*C08L 53/02* (2006.01)
*C08L 75/04* (2006.01)

(52) U.S. Cl. ............ 525/89; 525/90; 525/104; 525/213; 525/217; 525/235; 525/294; 525/331.5; 525/329.9; 525/338; 525/88; 524/453

(58) Field of Classification Search ........... 525/89, 525/90, 104, 213, 217, 235, 294, 331.5, 329.9, 525/338, 88; 524/453
See application file for complete search history.

(56) References Cited

U.S. PATENT DOCUMENTS

| | | | |
|---|---|---|---|
| 5,250,607 A | * | 10/1993 | Comert et al. ............ 524/507 |
| 5,436,295 A | | 7/1995 | Nishikawa et al. |
| 5,859,131 A | | 1/1999 | Ishiura et al. |
| 6,106,952 A | | 8/2000 | Yamashita et al. |

FOREIGN PATENT DOCUMENTS

| | | |
|---|---|---|
| JP | 6-87998 | 3/1994 |
| JP | 7-118492 | 5/1995 |
| JP | 8-501343 | 2/1996 |
| JP | 10-139963 | 5/1998 |
| JP | 2002-178455 | 6/2002 |

* cited by examiner

*Primary Examiner*—James J. Seidleck
*Assistant Examiner*—Olga Asinovsky
(74) *Attorney, Agent, or Firm*—Oblon, Spivak, McClelland, Maier & Neustadt, P.C.

(57) ABSTRACT

The present invention provides a vinyl chloride polymer composition which comprises (i) a vinyl chloride polymer (a) and (ii) a block copolymer (b) having a polymer block (I) comprising of a block copolymer, which may be hydrogenated, of an aromatic vinyl compound polymer block and a conjugated diene polymer block, and a polymer block (II) of a polyurethane, in a specific weight ratio. The vinyl chloride polymer composition of the present invention has non-tackiness, excellent handling properties, favorable flexibility and mechanical properties, and favorable melt-adhesiveness to other materials, and shows no migration of the component serving as a plasticizer. The vinyl chloride polymer composition of the present invention can be applied for various uses such as a production of various molded articles and a production of a laminated structure with other materials.

18 Claims, No Drawings

VINYL CHLORIDE POLYMER COMPOSITION

TECHNICAL FIELD

The present invention relates to a vinyl chloride polymer composition. The vinyl chloride polymer composition of the present invention has non-tackiness, excellent handling properties, favorable flexibility and mechanical properties. In addition, it has favorable melt-adhesion to other materials, and shows no migration of the component serving as a plasticizer. Therefore, the vinyl chloride polymer composition of the present invention is effectively applied for various molded articles taking advantages of these characteristics.

BACKGROUND ART

A vinyl chloride resin is low-cost, suitable for general purpose and applied for various uses such as hard plates, hard mold products, water and sewerage pipes, valves and joints. Further, various modification methods of a vinyl chloride resin are also known.

For example, a soft polyvinyl chloride composition prepared by blending polyvinyl chloride with a liquid plasticizer such as a phthalic acid ester derivative is used in various fields, because it has flexibility and excellent strength properties. However, such a soft polyvinyl chloride composition, which contains a liquid plasticizer, has a problem of the reduced flexibility and the embrittlement due to the migration or the volatilization of the liquid plasticizer during long-term use, or during use under high temperature conditions.

Under such circumstances, in order to solve such a problem, it is proposed that polymeric plasticizers having no possibility of migration or volatilization, such as a chlorinated polyethylene, an ethylene-vinyl acetate copolymer, an ethylene-carbon monoxide-vinyl acetate copolymer, a thermoplastic polyurethane and a nitrile rubber, are blended with a polyvinyl chloride [see Japanese Patent Application Laid-open Nos. Sho 59-33345 and Sho 63-68654, etc.].

Whereas, as a compound having excellent properties such as impact resistance, and excellent processability, there is proposed a composition prepared by blending a vinyl chloride resin with an aromatic vinyl block copolymer such as a styrene-butadiene block copolymer, a styrene-isoprene block copolymer or a hydrogenated product thereof [see Japanese Patent Application Laid-open No. Hei 5-117474]. Further, the International Patent Application Publication No. WO94/06859 discloses a composition prepared by blending a specific ethylene-α-olefin copolymer with a thermoplastic resin such as a polyolefin, a polyurethane or a polyvinyl chloride, for the purpose of improving the impact resistance of those thermoplastic resin at low temperature. The aromatic vinyl block copolymer or a hydrogenated product thereof, or the specific ethylene-α-olefin copolymer can also be considered as a kind of polymeric plasticizer.

Thus, it is known that various polymers are blended with a vinyl chloride resin as plasticizers. However, it is important that the polymer to be blended is selected also in consideration of the processability as described in the Japanese Patent Application Laid-open No. Hei 5-117474.

DISCLOSURE OF THE INVENTION

The present invention has been made in view of these circumstances. It is therefore an object of the present invention to newly provide a vinyl chloride polymer composition which is excellent in handling properties and has excellent flexibility, and shows no migration of the plasticizer component, by blending a vinyl chloride polymer such as polyvinyl chloride with a polymer having a favorable compatibility therewith.

The present inventor has found that the above-described object can be solved by blending a vinyl chloride polymer with a specific block copolymer, and made further studies. As a result, the present inventor has completed the present invention.

Thus the present invention provides a vinyl chloride polymer composition, which comprises: (i) a vinyl chloride polymer (a); and (ii) a block copolymer (b) having a polymer block (I) of a block copolymer, which may be hydrogenated, of an aromatic vinyl compound polymer block and a conjugated diene polymer block, and a polymer block (II) of a polyurethane in an amount such that the weight of the vinyl chloride polymer (a) and that of the block copolymer (b) satisfy the following equation (1):

$$30/70 \leq Wa/Wb \leq 98/2 \tag{1};$$

wherein Wa and Wb mean the weights of the vinyl chloride polymer (a) and the block copolymer (b), respectively.

Here, the block copolymer (b) is quite different from any of the polymers to be blended into the vinyl chloride polymer in the above-described arts.

BEST MODE FOR CARRYING OUT THE INVENTION

As the vinyl chloride polymer (a) used in the present invention, polymers having 50% by weight or more of the structural unit derived from vinyl chloride are preferable. The more preferred vinyl chloride polymer is the one having 70% by weight or more of the structural unit derived from vinyl chloride, and the still more preferred vinyl chloride polymer is the one having 80% by weight or more of the structural unit derived from vinyl chloride.

The vinyl chloride polymer (a) can contain one or more of the structural unit derived from a vinyl monomer other than vinyl chloride. The vinyl monomer other than vinyl chloride can include vinyl compounds having a cyano group such as acrylonitrile and methacrylonitrile; C1–18 alkyl esters of acrylic acid or C1–18 alkyl esters of methacrylic acid such as methyl esters, ethyl esters, propyl esters, n-butyl esters, isobutyl esters, hexyl esters, 2-ethylhexyl esters, dodecyl esters and octadecyl esters; esters of acrylic acid or methacrylic acid and a diol such as ethylene glycol, propylene glycol or butanediol; vinyl esters of a carboxylic acid having 1 to 6 carbon atoms such as acetic acid or propionic acid; unsaturated carboxylic acids such as acrylic acid, methacrylic acid and maleic acid; unsaturated dicarboxylic anhydrides such as maleic anhydride; (meth)acrylamides such as acrylamide, methacrylamide and N,N-dimethylacrylamide; maleimide; N-substituted maleimides such as N-methylmaleimide, N-ethylmaleimide, N-phenylmaleimide and N-cyclohexylmaleimide; olefins such as ethylene, propylene and butylene; conjugated dienes such as butadiene and isoprene; aromatic vinyl compounds such as styrene, α-methylstyrene and p-methylstyrene; halogenated olefins other than vinyl chloride such as vinylidene chloride; and so on.

The vinyl chloride polymer (a) has preferably an average degree of polymerization of 300 to 5,000. By using a vinyl chloride polymer (a) having such average degree of polymerization, a vinyl chloride polymer composition having more improved properties such as non-tackiness, mechanical properties and processability can be obtained. The average degree of polymerization of the vinyl chloride polymer (a) falls between more preferably 400 and 3,000, still more preferably 500 and 2,000, and the most preferably 600 and 1,500. Here, the average degree of polymerization of the vinyl chloride polymer (a) referred to in this specification means the average degree of polymerization based on its specific viscosity as measured in accordance with JIS K-6721.

The block copolymer (b) is a block copolymer having a polymer block (I) of a block copolymer, which may be hydrogenated, of an aromatic vinyl compound polymer block and a conjugated diene polymer block and a polymer block (II) of a polyurethane.

In the block copolymer (b), the bonding form of the polymer block (I) and the polymer block (II) may be linear, branched, radial or mixed type thereof. Preferably, the polymer block (I) and the polymer block (II) are bonded in linear form.

The block copolymer (b) may have various structures such as $\alpha$-$\beta$, $\alpha$-$\beta$-$\alpha$ and $\beta$-$\alpha$-$\beta$, wherein $\alpha$ means the polymer block (I) and $\beta$ means the polymer block (II). The di-block structure of $\alpha$-$\beta$ is preferred. By using the block copolymer (b) having adi-blockstructure, a vinyl chloride polymer composition having more excellent properties such as non-tackiness, flexibility and processability can be obtained.

When the block copolymer (b) has two or more of the polymer blocks (I), each polymer block (I) may be the same or different. On the other hand, when the block copolymer (b) has two or more of the polymer blocks (II), each polymer block (II) may be the same or different. For example, the two polymer blocks (I) in the tri-block copolymer having the structure of $\alpha$-$\beta$-$\alpha$, or the two polymer blocks (II) in the tri-block copolymer having the structure of $\beta$-$\alpha$-$\beta$ may be the same or different in the species or the bonding forms of the structural unit, their number average molecular weight, and so on.

In the block copolymer (b), the weight ratio of the polymer block (I) based on the polymerblock (II) falls between preferably 5/95 and 95/5, more preferably 10/90 and 90/10, still more preferably 20/80 and 80/20, and the most preferably 30/70 and 70/30.

The aromatic vinyl compound which constitutes the aromatic vinyl compound polymer block in the polymer block (I) can include, for example, styrene, $\alpha$-methylstyrene, $\beta$-methylstyrene, o-methylstyrene, m-methylstyrene, p-methylstyrene, 2,4-dimethylstyrene, 2,4,6-trimethylstyrene, 4-propylstyrene, t-butylstyrene, 4-cyclohexylstyrene, 4-dodecylstyrene, 2-ethyl-4-benzylstyrene, 4-(phenylbutyl) styrene, 1-vinylnaphthalen, vinylanthracene, indene, acetonaphthylene, monofluorostyrene, difluorostyrene, monochlorostyrene and methoxystyrene. The aromatic vinyl compound polymer block may have a structural unit comprising only one aromatic vinyl compound, or may have a structural unit comprising two or more of the aromatic vinyl compounds. Among them, it is preferred that the aromatic vinyl compound polymer block mainly comprises structural units derived from styrene and/or $\alpha$-methylstyrene.

The aromatic vinyl compound polymer block can optionally have a slight amount of structural units comprising other copolymerizable monomers in addition to the structural units comprising aromatic vinyl compounds. The ratio of the structural units comprising other copolymerizable monomers in this case is preferably 30% by weight or less, and more preferably 10% by weight or less, based on the weight of the aromatic vinyl compound polymer block. The other copolymerizable monomers in this case can include, for example, 1-butene, pentene, hexene, butadiene, 2-methyl-1, 3-butadiene [namely, isoprene] and methyl vinyl ether.

The conjugated diene which constitutes the conjugated diene polymer block in the polymer block (I) can include, for example, 1,3-butadiene, 2-methyl-1,3-butadiene [namely, isoprene], 2,3-dimethyl-1,3-butadiene, 1,3-pentadiene and 1,3-hexadiene. The conjugated diene polymer block may have a structural unit comprising only one conjugated diene, or may have a structural unit comprising two or more of the conjugated dienes. When the conjugated diene polymer block have a structural unit derived from two or more of the conjugated dienes, their bonding forms may be a random, tapered, partially block form, or combination of two or more of the forms.

In the polymer block (I), the conjugated diene polymer block may be hydrogenated partially or entirely. In this case, the hydrogenation ratio of the conjugated diene polymer block is in the range of preferably 50 mol % or more, more preferably 60 mol % or more, and still more preferably 80 mol % or more, from the viewpoint of the heat resistance, the weatherability and the light-resistance.

From the viewpoint of the flexibility, mechanical properties and processability of the resulting vinyl chloride polymer composition, the conjugated diene polymer block in the polymer block (I) is preferably at least one of the polymer block selected from the group consisting of a polyisoprene which may be hydrogenated, a polybutadiene which may be hydrogenated and a copolymer of isoprene and butadiene which may be hydrogenated.

In the polymer block (I), the bonding form of the aromatic vinyl compound polymer block and the conjugated diene polymer block may be linear, branched, radial or mixed type thereof. Preferably, they are bonded in linear form.

The polymer block (I) may have various structures such as $(X-Y)_m-X$, $(X-Y)_n$ and $Y-(X-Y)_p$, wherein X means the aromatic vinyl compound polymer block; Y means the conjugated diene polymer block; and "m", "n" and "p" mean an integer of one or more, respectively. Among them, the polymer block (I) has preferably a structure in which two or more of the aromatic vinyl compound polymer blocks [X] and one or more of the conjugated diene polymer blocks [Y] are bonded in linear form, and has more preferably the tri-block structure of X—Y—X, because a vinyl chloride polymer composition having excellent properties such as non-tackiness, flexibility, mechanical properties and processability can be obtained.

When the polymer block (I) has two or more of the aromatic vinyl compound polymer blocks [X], each polymer block [X] may be the same or different. On the other hand, when the polymer block (I) has two or more of the conjugated diene polymer blocks [Y], each polymer block [Y] may be the same or different. For example, the two polymer blocks [X] in the tri-block structure of X—Y—X, or the two polymer blocks [Y] in the tri-block structure of Y—X—Y may be the same or different in the species or the bonding forms of the aromatic vinyl compound or the conjugated diene, their number average molecular weights, and so on.

In the polymer block (I), the content of the structural unit derived from the aromatic vinyl compound is preferably from 5 to 90% by weight based on the total structural unit of the polymer block (I). By using the block copolymer (b) having a polymer block (I) in which the content of the structural unit derived from the aromatic vinyl compound falls within the above-described range, a vinyl chloride polymer composition having excellent properties such as non-tackiness, flexibility, mechanical properties and processability can be obtained. The polymer block (I) contains the structural unit derived from the aromatic vinyl compound in the range of more preferably 10 to 90% by weight, and still more preferably 20 to 80% by weight, based on the total structural unit thereof.

In addition, in the polymer block (I), the number average molecular weight of the aromatic vinyl compound polymer block and that of the conjugated diene polymer block are not particularly limited, but the number average molecular weight of the aromatic vinyl compound polymer block preferably ranges from 2,500 to 75,000, and the number average molecular weight of the conjugated diene polymer block preferably ranges from 10,000 to 150,000, before hydrogenation. By using the block copolymer (b) having a polymer block (I) in which the number average molecular weight of the aromatic vinyl compound polymer block or that of the conjugated diene block falls within the above-described range, a vinyl chloride polymer composition having more improved properties such as non-tackiness, flexibility, mechanical properties and processability can be obtained.

The number average molecular weight of the polymer block (I) is preferably in the range of 15,000 to 300,000 before hydrogenation. By using the block copolymer (b) having a polymer block (I) in which the number average molecular weight falls within the above-described range, a vinyl chloride polymer composition having excellent properties such as non-tackiness, flexibility, mechanical properties and processability can be obtained. The polymer block (I) has, more preferably, the number average molecular weight of 20,000 to 100,000.

The polymer block (II) of the block copolymer (b) is a polymer block of a polyurethane which is made of a high polymer polyol, a chain extender and an organic diisocyanate.

The high polymer polyol which constitutes the polymer block (II) can include, for example, polyester polyols, polyether polyols, polycarbonate polyols, polyester-polycarbonate polyols, polyolefin polyols, conjugated diene polymer based polyols, castor oil based polyols, silicone based polyols and vinyl polymer based polyols. One or more of these high polymer polyols can be used. Among them, the preferred high polymer polyol is at least one of the high polymer polyols selected from the group consisting of polyester polyols, polyether polyols and polyolefin polyols. The more preferred high polymer polyol is polyester polyols and/or polyether polyols.

The polyester polyols can be prepared, for example, by subjecting a polyol component and a polycarboxylic acid component to the esterification reaction or the ester exchange reaction, or by subjecting a lactone to a ring-opening polymerization under the presence of a polyol component.

The polyol components used for the preparation of the polyester polyols can include ones conventionally used for the preparation of an ester, for example, aliphatic diols having 2 to 15 carbon atoms such as ethylene glycol, diethylene glycol, triethylene glycol, propylene glycol, 1,3-propanediol, 2-methyl-1,3-propanediol, 2,2-diethyl-1,3-propanediol, 1,3-butanediol, 1,4-butanediol, 2-methyl-1,4-butanediol, neopentyl glycol, 1,5-pentanediol, 3-methyl-1,5-pentanediol, 1,6-hexanediol, 1,7-heptanediol, 1,8-octanediol, 2-methyl-1,8-octanediol, 2,7-dimethyl-1,8-octanediol, 1,9-nonanediol, 2-methyl-1,9-nonanediol, 2,8-dimethyl-1,9-nonanediol and 1,10-decanediol; cycloaliphatic diols such as 1,4-cyclohexanediol, cyclohexanedimethanol and cyclooctanedimethanol; aromatic diols such as 1,4-bis(β-hydroxyethoxy)benzene; and polyhydric alcohols having not less than three hydroxyl groups such as trimethylolpropane, trimethylolethane, glycerin, 1,2,6-hexanetriol, pentaerythritol and diglycerol. One or more of these compounds can be used as a polyol component for the preparation of the polyester polyol.

Among them, for the preparation of the polyester polyol, the preferred polyol component is an aliphatic diol having 5 to 12 carbon atoms and a methyl group as a side chain such as 2-methyl-1,4-butanediol, 3-methyl-1,5-pentanediol, 2-methyl-1,8-octanediol, 2,7-dimethyl-1,8-octanediol, 2-methyl-1,9-nonanediol or 2,8-dimethyl-1,9-nonanediol. Especially, such an aliphatic diol having 5 to 12 carbon atoms and a methyl group as a side chain is used in the range of preferably 30 mol % or more, more preferably 50 mol % or more, based on the total polyol component used for the preparation of the polyester polyol.

The polycarboxylic acid components used for the preparation of the polyester polyols can include ones conventionally used for the preparation of an ester, for example, aliphatic dicarboxylic acids having 4 to 12 carbon atoms such as succinic acid, glutaric acid, adipic acid, pimelic acid, suberic acid, azelaic acid, sebacic acid, dodecanedioic acid, methylsuccinic acid, 2-methylglutaric acid, 3-methylglutaric acid, trimethyladipic acid, 2-methyloctanedicarboxylic acid, 3,8-dimethyldecanedicarboxylic acid and 3,7-dimethyldecanedicarboxylic acid; cycloaliphatic dicarboxylic acids such as cyclohexanedicarboxylic acid, dimer acid and hydrogenated product of dimer acid; aromatic dicarboxylic acids such as terephthalic acid, isophthalic acid, orthophthalic acid and naphthalenedicarboxylic acid; polycarboxylic acids such as trimellitic acid and pyromellitic acid; and derivatives thereof which can form esters, such as carboxylic acid esters and acid anhydrides. One or more of these compounds can be used as the polycarboxylic acid component. Among them, the preferred polycarboxylic acid component is an aliphatic dicarboxylic acid having 2 to 6 carbon atoms, and the more preferred polycarboxylic acid component is at least one compound selected from the group consisting of adipic acid, azelaic acid and sebacic acid.

The lactones used for the preparation of the polyester polyolscaninclude, for example, ε-caprolactone and β-methyl-δ-valerolactone.

The polyetherpolyols can include, for example, ones prepared by the ring-opening polymerization of a cyclic ether such as a polyethylene glycol, a polypropylene glycol, a polytetramethylene ether glycol or a poly(methyltetramethylene ether)glycol. One or more of these polyether polyols can be used. Among them, the preferred polyether polyol is a polytetramethylene ether glycol and/or a poly(methyltetramethylene ether)glycol.

The polycarbonate polyols can include, for example, those obtained by the reaction of a polyol component and a carbonate compound such as a dialkyl carbonate, an alkylene carbonate or a diaryl carbonate.

The polyol component, which constitutes the polycarbonate polyols, can include ones exemplified above as a polyol component constituting the polyester polyols. The dialkyl carbonate can include, for example, dimethyl carbonate and diethylcarbonate. Examples of the alkylene carbonate can include ethylene carbonate; and examples of the diaryl carbonates can include diphenyl carbonate.

The polyester polycarbonate polyols can include, for example, those obtained by the reaction of a polyol component, a polycarboxylic acid component and a carbonate compound; those obtained by the reaction of a carbonate compound and a previously prepared polyester polyol and polycarbonate polyol, and those obtained by the reaction of a previously prepared polyester polyol and polycarbonate polyol, a polyol component and a polycarboxylic acid component.

The conjugated diene polymer based polyols, or the polyolefin polyols can include a polyisoprene polyol, a polybutadiene polyol, a poly(butadiene/isoprene)polyol, a poly(butadiene/acrylonitrile)polyol, a poly(butadiene/styrene)polyol, and a hydrogenated product thereof, prepared by polymerizing a conjugated diene such as butadiene or isoprene, or a conjugated diene and another monomer, by a living polymerization method, or the like in the presence of a polymerization initiator, followed by a reaction with an epoxy compound. One or more of these conjugated diene polymer based polyols, or the polyolefin polyols can be used.

The number average molecular weight of the high polymer polyol preferably falls within the range of 500 to 10,000. By using the block copolymer (b) having a polymer block (II) made of the high polymer polyol with such a number average molecular weight, a vinyl chloride polymer composition having excellent properties such as non-tackiness, flexibility, mechanical properties and processability can be obtained. The number average molecular weight of the high polymer polyol is in the range of more preferably 700 to 8,000, and still more preferably 800 to 5,000. Here, the number average molecular weight of the high polymer polyol referred to in this specification means the number average molecular weight based on its hydroxyl value as measured in accordance with JIS K-1577.

The chain extender which constitutes the polymer block (II) can include ones conventionally used for the preparation of a polyurethane. Preferred chain extender is a compound having a molecular weight of not more than 400 and having two or more active hydrogen atoms capable of reacting with isocyanate group.

The chain extender can include, for example, diols such as ethylene glycol, propylene glycol, 1,4-butanediol, 1,6-hexanediol, 2-methyl-1,3-propanediol, 2,2-diethyl-1,3-propanediol, 2-butyl-2-ethyl-1,3-propanediol, 2-methyl-1,4-butanediol, neopentyl glycol, 3-methyl-1,5-pentanediol, 2,4-diethyl-1,5-pentanediol, 2-ethyl-1,3-hexanediol, 2-methyl-1,8-octanediol, 2,7-dimethyl-1,8-octanediol, 2-methyl-1,9-nonanediol, 2,8-dimethyl-1,9-nonanediol, 1,4-bis(β-hydroxyethoxy)benzene, 1,4-cyclohexanediol, bis(β-hydroxyethyl)terephthalate, xylylene glycol, 1,4-cyclohexanedimethanol, 1,4- or 1,5-cyclooctanedimethanol and 3(or 4),8(or 9)-dihydroxymethyltricyclo[5.2.1.0$^{2,6}$]decane; diamines such as hydrazine, ethylenediamine, propylenediamine, xylylenediamine, isophorone diamine, piperazine, piperazine derivatives, phenylenediamine, toluylenediamine, adipic acid dihydrazide and isophthalic acid dihydrazide; aminoalcohols such as aminoethyl alcohol and aminopropyl alcohol; and so on. One or more of these chain extenders can be used. Among them, the preferred chain extender is an aliphatic diol having 2 to 12 carbon atoms, and the more preferred chain extender is 1,4-butanediol, 3-methyl-1,5-pentanediol, 2-methyl-1,8-octanediol or 1,9-nonanediol.

The organic diisocyanate which constitute the polymer block (II) can include ones conventionally used for the preparation of a polyurethane. Examples of the organic diisocyanate include aromatic diisocyanates such as 4,4'-diphenylmethane diisocyanate, tolylene diisocyanate, phenylene diisocyanate, xylylene diisocyanate, 1,5-naphthylene diisocyanate and 3,3'-dichloro-4,4'-diphenylmethane diisocyanate; aliphatic or alicyclic diisocyanates such as hexamethylene diisocyanate, isophorone diisocyanate, 4,4'-methylenebis(cyclohexyl isocyanate) and hydrogenated xylylene diisocyanate; and so on. One or more of these organic diisocyanates can be used. Among them, the preferred organic diisocyanate is 4,4'-diphenylmethane diisocyanate.

The amount of the high polymer polyol, the chain extender and the organic diisocyanate which constitute the polymer block (II) is preferably adjusted such that the content of nitrogen derived from the organic diisocyanate is in the range of 1 to 6.5% by weight based on the total weight of the high polymer polyol, the chain extender and the organic diisocyanate. By using the block copolymer (b) having a polymer block (II) in which the content of nitrogen derived from the organic diisocyanate is set within the above-described range, a vinyl chloride polymer composition having excellent properties such as non-tackiness, flexibility, mechanical properties and processability can be obtained. In the polymer block (II), the content of the nitrogen derived from the organic diisocyanate falls more preferably between 1 and 6% by weight, still more preferably between 1.3 and 5.5% by weight, and the most preferably between 1.6 and 5% by weight, based on the total weight of the high polymer polyol, the chain extender and the organic diisocyanate.

The number average molecular weight of the polymer block (II) falls preferably between 200 and 300,000. By using the block copolymer (b) having a polymer block (II) with such a number average molecular weight, a vinyl chloride polymer composition having excellent properties such as non-tackiness, flexibility, mechanical properties and processability can be obtained. The number average molecular weight of the polymer block (II) is in the range of more preferably 500 to 150,000, and still more preferably 1,000 and 100,000.

The hardness of the polymer block (II) falls preferably between 30 and 99, expressed in the JIS A hardness of the polyurethane corresponding to the polymer block (II). By using the block copolymer (b) having a polymer block (II) with such a hardness, a vinyl chloride polymer composition having excellent properties such as non-tackiness, flexibility, mechanical properties and processability can be obtained. The JIS A hardness of the polyurethane corresponding to the polymer block (II) is more preferably between 45 and 97, and still more preferably between 60 and 95.

The block copolymer (b) can be obtained, for example, by effecting a polyurethane forming reaction under the presence of a block copolymer, which may be referred to as "functionality. block copolymer" hereinafter, having a structure corresponding to the polymer block (I) and a functional group reactive with a component of the polymer block (II). That is, the block copolymer (b) can be obtained by forming the polymer block (II) of a polyurethane on the polymer chain of a block copolymer, which may be hydrogenated, having an aromatic vinyl compound polymer block and an conjugated diene polymer block, and having a functional group reactive with a component such as an organic diisocyanate, a chain extender or a high polymer polyol. In addition the block copolymer (b) can also be obtained by subjecting a functionality block copolymer and a polyurethane having a structure corresponding to the polymer block (II).

Examples of the functional group which is contained in the functionality block copolymer and which is reactive with a component of the polymer block (II) can include, for example, ones reactive with a high polymer polyol and/or a chain extender, such as carboxyl group, acid anhydride group, thiocarboxyl group, isocyanate group, and so on; and ones reactive with an organic diisocyanate, such as hydroxyl group, amino group, mercapto group, carboxyl group, acid anhydride group, thiocarboxyl group, isocyanate group, and so on. The functionality block copolymer can contain one or more of these functional groups.

The functionality block copolymer has preferably a functional group reactive with an organic diisocyanate. The more preferred functional group is hydroxyl group, because a homogeneous polyurethane forming reaction can be conducted upon the preparation of the block copolymer (b).

The functional group reactive with a component of the polymer block (II) can locate preferably on a terminal of the functionality block copolymer. When a functionality block copolymer having such a functional group on a terminal of the molecule is used, the functional group can participate in the extension of main chain structure by polyurethane forming reaction upon the preparation of the block copolymer (b). By using the block copolymer (b) thus obtained, a vinyl chloride polymer composition having excellent properties such as non-tackiness, flexibility, mechanical properties and processability can be obtained with reliability.

The average number of the functional group reactive with a component of the polymer block (II) is preferably not less than 0.6, more preferably not less than 0.7, and still more preferably between 0.7 and 1 per a molecule of the functionality block copolymer.

The functionality block copolymer can be prepared by an ionic polymerization such as an anionic polymerization or a cationic polymerization; a single site polymerization, a radical polymerization or the like. For example, the functionality block copolymer can be prepared by the procedures, in which an anionic polymerization is employed, comprising successively polymerizing an aromatic vinyl compound and a conjugated diene in an inert organic solvent such as n-hexane or cyclohexane using an alkyl lithium compound as a polymerization initiator, adding a compound having an oxirane skeleton such as ethylene oxide, propylene oxide or styrene oxide; or a lactone such as ε-caprolactone, β-propiolactone, dimethylpropiolactone [pivalolactone] or methylvalerolactone when the desired molecular structure and the desired molecular weight are obtained, and then adding an active hydrogen-containing compound such as alcohols, carboxylic acids or water to terminate the polymerization. Then the obtained functionality block copolymer is preferably hydrogenated in an inert organic solvent such as n-hexane or cyclohexane under the presence of a hydrogenation catalyst such as a Ziegler catalyst consisting an alkylaluminum compound and cobalt or nickel at a reaction temperature of 20 to 150° C. and at a hydrogen pressure of 1 to 150 kg/cm$^2$. In addition, the functionality block copolymer, before or after hydrogenation, may be optionally modified with maleic anhydride, and soon. The functionality block copolymer and/or the hydrogenated product thereof may contain, depending on the preparation method thereof, a block copolymer having an aromaticvinyl compound polymer block, a conjugated diene polymer block and no functional group.

As the functionality block copolymer, commercially available ones can be used.

The number average molecular weight of the functionality block copolymer is in the range of preferably 15,000 to 300,000, and more preferably 20,000 to 100,000. Here, the number average molecular weight of the functionality block copolymer is a value obtained by gel permeation chromatography [GPC], based on the standard polystyrene calibration curve.

The MFR [melt flow rate] of the functionality block copolymer, when measured at 230° C. under the load of 2.16 kg, falls preferably between 0.01 and 100 g/10 minutes. By using a functionality block copolymer having such an MFR value, a thermoplastic polymer composition having excellent properties such as non-tackiness, processability for melt molding and melt-adhesiveness can be obtained. The MFR [melt flow rate] of the functionality block copolymer, when measured at 230° C. under the load of 2.16 kg, falls more preferably between 0.05 and 80 g/10 minutes. Here, the MFR value of the functionality block copolymer is measured in according with ASTM D-1238.

The polymer block (II) or a polyurethane corresponding to the polymer block (II) can be formed with the above-described high polymer polyol, the chain extender and the organic diisocyanate by a conventional polyurethane forming reaction.

In the formation of the polymer block (II) or a polyurethane corresponding to the polymer block (II), each component is employed preferably in amounts such that the isocyanate group of the organic diisocyanate is present by a ratio of 0.9 to 1.3 moles per 1 mole of the total active hydrogen atoms of the high polymer polyol and the chain extender. By using a block copolymer having the polymer block (II) prepared by a high polymer, a chain extender and an organic diisocyanate with the above-described ratio, a vinyl chloride polymer composition having more excellent properties such as non-tackiness, flexibility, mechanical properties and processability can be obtained.

Also, in the formation of the polymer block (II) and a polyurethane corresponding to the polymer block (II), it is preferable to use each component in amounts such that the content of nitrogen derived from the organic diisocyanate is in the range of 1 to 6.5% by weight based on the total weight of the high polymer polyol, the chain extender and the organic diisocyanate. By using a block copolymer (b) having the polymer block (II) formed of a high polymer polyol, a chain extender and an organic diisocyanate in the above-described ratio, a vinyl chloride polymer composition having excellent properties such as non-tackiness, flexibility, mechanical properties and processability can be obtained. The each component is used in amounts such that the content of nitrogen derived from the organic diisocyanate falls more preferably between 1 and 6% by weight, still more preferably between 1.3 and 5.5% by weight, and the most preferably between 1.6 and 5% by weight, based on the total weight of the high polymer polyol, the chain extender and the organic diisocyanate.

The block copolymer (b) can be easily and preferably prepared by (A) the reaction of a functionality block copolymer, a high polymer polyol, a chain extender and an organic diisocyanate, or (B) the reaction of a functionality block copolymer and a reaction product of a high polymer polyol, a chain extender and an organic diisocyanate.

With respect to the reaction (B), the reaction product can include a reaction mixture of a high polymer polyol, a chain extender and an organic diisocyanate, which may be further subjected to work up with the conventional process. Also, commercially available polyurethanes may be used as the reaction product so long as they are prepared from a high polymer polyol, a chain extender and an organic diisocyanate.

The reaction product of a high polymer polyol, a chain extender and an organic diisocyanate can contain, in addition to polyurethane produced therefrom, the unreacted high polymer polyol, the unreacted chain extender and the unreacted organic diisocyanate according to the amounts of the reactants, degree of conversion, other reaction conditions, and so on. In this case, the reaction between a functionality block copolymer and a polyurethane produced from a high polymer polyol, a chain extender and an organic diisocyanate, and the reaction between a functionality block copolymer, a high polymer polyol, a chain extender and an organic diisocyanate proceed simultaneously.

When the block copolymer (b) is produced by the reaction (A), the weight ratio of a functionality block copolymer based on the sum of a high polymer polyol, a chain extender and an organic diisocyanate ([the weight of a functionality block copolymer]:[the total weight of a high polymer polyol, a chain extender and an organic diisocyanate]) is in the range of preferably 5:95 to 95:5, more preferably 10:90 to 90:10, still more preferably 20:80 to 80:20, and the most preferably 30:70 to 70:30.

Also, when the block copolymer (b) is produced by the reaction (B), the weight ratio of a functionality block copolymer based on a reaction product of a high polymer polyol, a chain extender and an organic diisocyanate ([the weight of a functionality block copolymer]:[the weight of a reaction product of a high polymer polyol, a chain extender and an organic diisocyanate]) is in the range of preferably 5:95 to 95:5, more preferably 10:90 to 90:10, still more preferably 20:80 to 80:20, and the most preferably 30:70 to 70:30.

Upon the preparation of the block copolymer (b), a catalyst for polyurethane forming reaction can be used. Such catalyst for polyurethane forming reaction include organic tin compounds such as dibutyltin diacetate, dibutyltin dilaurate and dibutyltin bis(3-ethoxybutyl 3-mercaptopropionate); titanic acid; organic titanium compounds such as tetraisopropyl titanate, tetra-n-butyltitanate, polyhydroxytitanium stearate and titanium acetylacetonate; tertiary amines such as triethylene diamine, N-methylmorpholine, N,N,N', N'-tetramethylethylenediamine, N,N,N',N'-tetramethylhexamethylene diamine, triethylamine and N,N-dimethylaminoethanol; and so on.

The amount of the catalyst for polyurethane forming reaction falls preferably between 0.1 ppm and 0.2% by weight, more preferably between 0.5 ppm and 0.02% by weight, and still more preferably between 1 ppm and 0.01% by weight, based on the total weight of the functionality block copolymer, the high polymer polyol, the chain extender and the organic diisocyanate, or based on the total weight of the functionality block copolymer and the reaction product of the high polymer polyol, the chain extender and the organic diisocyanate.

Upon the preparation of the block copolymer (b), the catalyst for polyurethane forming reaction can be mixed with one or more of the functionality block copolymer, the high polymer polyol, the chain extender, the organic diisocyanate and the reaction product of the high polymer polyol, the chain extender and the organic diisocyanate. In the more preferred embodiments, the catalyst for polyurethane forming reaction is mixed with the high polymer polyol.

When the block copolymer (b) is produced in the presence of a catalyst for polyurethane forming reaction, it is desirable to add a deactivator of the catalyst for polyurethane forming reaction to the obtained block copolymer (b). Examples of the deactivator can include phosphorus compounds such as lauryl phosphate, oleyl phosphate, stearyl phosphate, dilauryl phosphate, dioleyl phosphate, distearyl phosphate, tris(2-ethylhexyl)phosphate, bis(octadecyl)pentaerythritol diphosphate, diethyl phenylphosphonate and diethyl 3,5-di-tert-butyl-4-hydroxybenzylphosphonate; phenolic compounds such as 2,2'-methylenebis(6-tert-butyl-4-methylphenol), 2,2'-methylenebis(6-tert-butyl-4-ethylphenol), 2-hydroxy-4-benzyloxybenzophenone, 2-(3',5'-di-tert-butyl-2'-hydroxyphenyl)benzotriazole, 2-[2-hydroxy-3,5-bis(α,α-dimethylbenzyl)phenyl]-2H-benzotriazole and 4,4'-dioctyl-2,2'-biphenol. The preferred deactivator is a phosphorus compound.

The amount of the deactivator of the catalyst for polyurethane forming reaction falls preferably between 1 ppm and 2% by weight, more preferably between 5 ppm and 0.2% by weight, and still more preferably between 10 ppm and 0.1% by weight, based on the total weight of the functionality block copolymer, the high polymer polyol, the chain extender and the organic diisocyanate, or based on the total weight of the functionality block copolymer and the reaction product of the high polymer polyol, the chain extender and the organic diisocyanate.

The block copolymer (b) can be prepared according to the conventional urethane forming techniques. The block copolymer (b) can be prepared by either "prepolymer process" or "one-shot process".

The block copolymer (b) is preferably prepared substantially without the presence of any solvent. The block copolymer (b) is preferably prepared by melt kneading with a machine such as a single-screw extruder, a twin-screw extruder, a kneading machine and a Banbury mixer. The conditions for melt kneading are properly determined on account of the species of the raw material or the kind of the machine employed. The melt kneading is, in general, conducted at a temperature of 180 to 260° C. for 1 to 15 minutes.

Specific examples of the reaction used for forming polyurethane include the following procedures [1] to [6].

[1] A functionality block copolymer, a high polymer polyol and a chain extender are mixed, for example, while heating at the temperature of 40 to 100° C. An organic diisocyanate is added to the resulting mixture in amounts such that the molar ratio of the active hydrogen atoms based on the isocyanate groups falls preferably between 0.9 and 1.3, followed by stirring for a short time. Then, the resulting mixture is heated, for example, at the temperature of 80 to 200° C.

[2] A high polymer polyol, a chain extender and an organic diisocyanate are continuously fed into an extruder such as a multi-screw extruder and heated, for example, at the temperature of 90 to 260° C. A functionality block copolymer is continuously fed into the heated mixture at a rate such that the molar ratio of the active hydrogen atoms based on the isocyanate groups falls preferably between 0.9 and 1.3, and continuously melt-polymerized at the temperature of, for example, 180 to 260° C.

[3] A functionality block copolymer, a high polymer polyol, a chain extender and an organic diisocyanate are continuously fed into an extruder such as a multi-screw extruder at a rate such that the molar ratio of the active hydrogen atoms based on the isocyanate groups falls preferably between 0.9 and 1.3, and continuously melt-polymerized at the temperature of, for example, 180 to 260° C.

[4] A high polymer polyol, a chain extender and an organic diisocyanate are continuously fed into an extruder such as a multi-screw extruder and heated, for example, at the temperature of 90 to 260° C. to effect the polyurethane formation. A functionality block copolymer is continuously added to the polyurethane and continuously melt-polymerized at the temperature of, for example, 180 to 260° C.

[5] A functionality block copolymer and a polyurethane, which may be commercially available, are continuously fed into an extruder such as a multi-screw extruder and reacted at the temperature of, for example, 180 to 260° C.

[6] A functionality block copolymer, a high polymer polyol, a chain extender and an organic diisocyanate are added to an organic solvent in amounts such that the molar ratio of the active hydrogen atoms based on the isocyanate groups falls preferably between 0.9 and 1.3, to effect the polyurethane formation.

The polymer composition, which may be referred to as "block copolymer composition" hereinafter, obtained by the reaction of the functionality block copolymer, the high polymer polyol, the chain extender and the organic diisocyanate, or by the reaction of the functionality block copolymer and the reaction product of the high polymer polyol, the chain extender and the organic diisocyanate, according to the above-described methods, can contain the unreacted high polymer polyol, the unreacted chain extender or the unreacted organic diisocyanate other than the block copolymer (b). The amounts of these compounds are varied according to the reaction conditions such as a ratio of the reactants and reaction temperature.

The block copolymer (b) thus prepared may contain a polyurethane formed by the high polymer polyol, the chain extender and the organic diisocyanate. Also, the block copolymer (b) may contain a block copolymer, which may be hydrogenated, having an aromatic vinyl compound polymer block and a conjugated diene polymer block, and having a functional group on a terminal of the molecule. In addition, the block copolymer (b) can contain a block copolymer having an aromatic vinyl compound polymer block, a conjugated diene polymer block and no functional group.

The block copolymer (b) can be obtained, for example, by the procedures of (i) subjecting the block copolymer composition, which may be optionally pelletized and pulverized into appropriate size, to the treatment with a good solvent for polyurethane such as dimethylformamide in order to remove polyurethane unreacted with the functionality block copolymer, and the treatment with a good solvent for functionality block copolymer such as cyclohexane in order to remove the unreacted functionality block copolymer and a block copolymer corresponding to the polymer block (I), successively, and (ii) drying the remaining solid material.

In the present invention, the block copolymer composition can be employed, as it is, for the preparation of the vinyl chloride polymer composition as long as it does not depart from the scope of the invention.

The vinyl chloride composition of the present invention comprises the vinyl chloride polymer (a) and the block copolymer (b) at a weight ratio to meet the following equation (1).

$$30/70 \leq Wa/Wb \leq 98/2 \quad (1);$$

wherein Wa means the weight of the vinyl chloride polymer (a) and Wb means the weight of the block copolymer (b).

When the amount of the vinyl chloride polymer (a) is less than the above-described range, the properties of the vinyl chloride polymer composition such as non-tackiness, mechanical properties and processability are reduced. On the other hand, when the amount of the vinyl chloride polymer (a) is more than the above-described range, it is difficult to produce a vinyl chloride polymer composition having good flexibility. In addition, in such a case, the processability of the vinyl chloride polymer composition is reduced.

The weight ratio [Wa/Wb] of the vinyl chloride polymer (a) and the block copolymer (b) is in the range of preferably 35/65 to 90/10, and more preferably 40/60 to 85/15.

The vinyl chloride polymer composition of the present invention can contain a thermoplastic polyurethane (c). As the thermoplastic polyurethane (c), there can be used those prepared from the reaction of the above-describe high polymer polyol, the chain extender and the organic diisocyanate, which is not limited to the polyurethane produced upon the preparation of the block copolymer (b). The thermoplastic polyurethane (c) has preferably similar profiles of the polymer block (II) in the block copolymer (b).

With respect to the thermoplastic polyurethane (c), the content of nitrogen derived from the organic diisocyanate falls preferably between 1 and 6.5% by weight, more preferably between 1 and 6% by weight, still more preferably 1.3 and 5.5% by weight, and the most preferably between 1.6 and 5% by weight, based on the total weight of the high polymer polyol, the chain extender and the organic diisocyanate.

The number average molecular weight of the thermoplastic polyurethane (c) falls preferably between 200 and 300,000, more preferably between 500 and 150,000, and still more preferably between 1,000 and 100,000. In addition, the JIS A hardness of the thermoplastic polyurethane (c) falls preferably between 30 and 99, more preferably between 45 and 97, and still more preferably between 60 and 95.

The amount of the thermoplastic polyurethane (c) is preferably not more than 1000 parts by weight, more preferably in the range of 0 to 500 parts by weight, and still more preferably in the range of 0 to 300 parts by weight, based on 100 parts by weight of the block copolymer (b).

The vinyl chloride polymer composition of the present invention can contain a block copolymer (d), which may be hydrogenated, having an aromatic vinyl compound polymer block and a conjugated diene polymer block, which may be referred to as "aromatic vinyl compound block copolymer (d)" hereinafter. Such an aromatic vinyl compound block copolymer (d) is not limited to those derived from the functionality block copolymer used in the preparation of the block copolymer (b), and can include a block copolymer of an aromatic vinyl compound, a conjugated diene and another monomer copolymerizable with these. The aromatic vinyl compound block copolymer (d) has preferably similar profiles of the polymer block (I) in the block copolymer (b).

With respect to the aromatic vinyl compound block copolymer (d), the content of the structural unit derived from the aromatic vinyl compound is preferably in the range of 5 to 90% by weight, more preferably 10 to 90% by weight, and still more preferably 20 to 80% by weight, based on the total structural unit of the aromatic vinyl compound block copolymer (d). In addition, in the aromatic vinyl compound block copolymer (d), the number average molecular weight of the aromatic vinyl compound polymer block and that of the conjugated diene polymer block are not particularly limited, but the number average molecular weight of the aromatic vinyl compound polymer block preferably ranges from 2,500 to 100,000, and the number average molecular weight of the conjugated diene polymer block preferably ranges from 10,000 to 250,000 before hydrogenation. Also, the number average molecular weight of the aromatic vinyl compound block copolymer (d) is in the range of preferably 15,000 to 500,000, and more preferably 20,000 to 400,000, before hydrogenation. Here, the number average molecular weight of the aromatic vinyl compound block copolymer (d) is a value obtained by gel permeation chromatography [GPC], based on the standard polystyrene calibration curve.

In the aromatic vinyl compound block copolymer (d), the conjugated diene polymer block may be hydrogenated partially or entirely. In this case, the hydrogenation ratio of the conjugated diene polymer block is preferably 50 mol % or more, more preferably 60 mol % or more, and still more preferably 80 mol % or more, from the viewpoint of heat resistance, weatherability and light resistance. The conjugated diene polymer block in the aromatic vinyl compound block copolymer (d) is preferably at least one of the polymer block selected from the group consisting of a polyisoprene which may be hydrogenated, a polybutadiene which may be hydrogenated and a copolymer of isoprene and butadiene which may be hydrogenated.

In the aromatic vinyl compound block copolymer (d), the bonding form of the aromatic vinyl compound polymer block and the conjugated diene polymer block may be linear, branched, radial or mixed type thereof. Preferably, they are bonded in linear form. The aromatic vinyl compound block copolymer (d) has preferably a structure in which two or more of the aromatic vinyl compound polymer blocks and one or more of the conjugated diene blocks are bonded in linear form, and has more preferably a tri-block structure in which two aromatic vinyl compound polymer blocks and one conjugated diene block are bonded in linear form.

The aromatic vinyl compound block copolymer (d) may have, on a terminal or in a molecular chain, a functional group such as hydroxyl group, carboxyl group, acid anhydride group, epoxy group, amino group, a halogen atom or mercapto group. The MFR [melt flow rate] value of the aromatic vinyl compound block copolymer (d), when measured at 230° C. under the load of 2.16 kg, is preferably not more than 100 g/10 minutes, more preferably not more than 50 g/10 minutes, and still more preferably not more than 30 g/10 minutes. Here, the MFR value of the aromatic vinyl compound block copolymer (d) is measured in accordance with ASTMD-1238. In addition, the JIS A hardness of the aromatic vinyl compound block copolymer (d) falls preferably between 30 and 95, more preferably between 40 and 90, and still more preferably between 50 and 85. Here, the JIS A hardness of the aromatic vinyl compound block copolymer (d) is measured in accordance with JIS K-6253.

The amount of the aromatic vinyl compound block copolymer (d) is preferably not more than 500 parts by weight, more preferably in the range of 0 to 300 parts by weight, based on 100 parts by weight of the block copolymer (b).

The vinyl chloride polymer composition of the present invention can contain an ethylene-α-olefin copolymer(e). The ethylene-α-olefin copolymer (e) is disclosed in the International Patent Application Publication No. 94/06859 [WO 94/06859]. It is known that the ethylene-α-olefin copolymer (e) can be blended with a thermoplastic polymer such as a polyolefin, a polyurethane or a polyvinyl chloride, in order to improve the impact resistance of these resins at low temperature. By using such an ethylene-α-olefin copolymer (e), a vinyl chloride polymer composition having more improved flexibility can be obtained.

The α-olefin unit which constitutes the ethylene-α-olefin copolymer (e) can include, for example, ones derived from an α-olefin such as propylene, 1-butene, 2-methyl-1-butene, 3-methyl-1-butene, 1-pentene, 4-methyl-1-pentene, 1-hexene, 1-octene, 1-decene or 1-octadecene. The ethylene-α-olefin copolymer (e) can include one or more of these α-olefin units.

As the α-olefin unit, the preferred one is the structural unit derived from an α-olefin having 4 or more carbon atoms, the more preferred one is the structural unit derived from an α-olefin having 6 to 12 carbon atoms, the still more preferred one is the structural unit derived from an α-olefin having 6 to 10 carbon atoms, and the most preferred one is the structural unit derived from 1-hexene or 1-octene, because a vinyl chloride polymer composition having more improved flexibility can be obtained.

The ethylene-α-olefin copolymer (e) can optionally have a slight amount of structural units derived from a non-conjugated diene. Such a structural unit includes, for example, ones derived from divinylbenzene, ethylidene norbornene, dicyclopentadiene, 1,4-hexadiene, 1,4-cyclohexadiene, cyclooctadiene and methylenenorbornene.

The molar ratio of the ethylene unit based on the α-olefin unit [ethylene unit/α-olefin unit], both of which constitute the ethylene-α-olefin copolymer (e), falls preferably between 55/45 and 99/1. When the molar ratio of the ethylene unit is lower than the above-described range, the softening temperature of the ethylene-α-olefin copolymer (e) becomes low, which is the cause of the tendency of the hang up of the resulting vinyl chloride polymer composition. On the other hand, the molar ratio of the ethylene unit is higher than the above-described range, it is difficult to produce a vinyl chloride polymer composition having good flexibility. The molar ratio of the ethylene unit based on the α-olefin unit [ethylene unit/α-olefin unit] falls more preferably between 75/25 and 95/5, and still more preferably between 80/20 and 95/5.

The MFR [melt flow rate] value of the ethylene-α-olefin copolymer (e), when measured at 190° C. under the load of 2.16 kg, is preferably in the range of 0.1 to 100 g/10 minutes. By using an ethylene-α-olefin copolymer (e) having such an MFR value, a vinyl chloride polymer composition having excellent properties such as non-tackiness, flexibility, mechanical properties and processability can be obtained. The MFR [melt flow rate] value of the ethylene-α-olefin copolymer (e), when measured at 190° C. under the load of 2.16 kg, is more preferably in the range of 0.2 to 70 g/10 minutes, and still more preferably in the range of 0.3 to 50 g/10 minutes. Here, the MFR value of the ethylene-α-olefin copolymer (e) is measured in accordance with ASTM D-1238.

The Shore A hardness of the ethylene-α-olefin copolymer (e) falls preferably between 30 and 90. By using an ethylene-α-olefin copolymer (e) having such a Shore A hardness, a vinyl chloride polymer composition having excellent properties such as non-tackiness, flexibility, mechanical properties and processability can be obtained. The Shore A hardness of the ethylene-α-olefin copolymer (e) falls more preferably between 40 and 85, and still more preferably between 45 and 80. Here, the Shore A hardness of the ethylene-α-olefin copolymer (e) is measured in accordance with ASTM D-2240.

The density of the ethylene-α-olefin copolymer (e) is preferably in the range of 0.80 to 0.95 g/cm$^3$. By using an ethylene-α-olefin copolymer (e) having such a density, a vinyl chloride polymer composition having excellent properties such as non-tackiness, flexibility, mechanical properties and processability can be obtained. The density of the ethylene-α-olefin copolymer (e) is more preferably in the range of 0.82 to 0.93 g/cm$^3$, and still more preferably in the range of 0.85 to 0.90 g/cm$^3$. Here, the density of the ethylene-α-olefin copolymer (e) is measured in accordance with ASTM D-792.

The Mooney viscosity of the ethylene-α-olefin copolymer (e), measured at 100° C. with L type rotor, is preferably in the range of 5 to 100 $ML_{1+4}$ (100° C.). By using an ethylene-α-olefin copolymer (e) having such a Mooney viscosity, a vinyl chloride polymer composition having excellent properties such as non-tackiness, flexibility, mechanical properties and processability can be obtained. The Mooney viscosity of the ethylene-α-olefin copolymer (e) is more preferably in the range of 10 to 70 $ML_{1+4}$ (100° C.). Here, the Mooney viscosity of the ethylene-α-olefin copolymer (e) is measured in accordance with ASTM D-1646.

The ethylene-α-olefin copolymer (e) is preferably used at a weight ratio, based on the weight of the vinyl chloride polymer (a) and the block copolymer (b), to meet the following equations (2) and (3).

$$1/100 \leq Wb/(Wa+We) \leq 100/100 \qquad (2)$$

$$30/70 \leq Wa/We \leq 95/5 \qquad (3);$$

wherein Wa means the weight of the vinyl chloride polymer (a), Wb means the weight of the block copolymer (b) and We means the weight of the ethylene-α-olefin copolymer (e).

By using the ethylene-α-olefin copolymer (e) in the above-described amount, a vinyl chloride polymer composition having excellent properties such as non-tackiness, flexibility, mechanical properties and processability can be obtained.

The weight ratio [Wa/We] of the ethylene-α-olefin copolymer (e) and the vinyl chloride polymer (a) is in the range of preferably 40/60 to 90/10, and more preferably 50/50 to 85/15.

In addition, the weight ratio [Wb/(Wa+We)] of the ethylene-α-olefin copolymer (e), the vinyl chloride polymer (a) and the block copolymer (b) is in the range of preferably 2/100 to 60/100, more preferably 3/100 to 40/100, and still more preferably 3/100 to 25/100.

The vinyl chloride polymer composition of the present invention can contain a paraffin oil (f).

As the paraffin oil (f), ones containing 60% by weight or more of a paraffin ingredient [a linear hydrocarbon] are generally used. The preferred oil is the one containing 80% by weight or more of a paraffin ingredient. The paraffin oil (f) can contain an ingredient having an aromatic ring such as benzene ring or naphthalene ring.

The dynamic viscosity of the paraffin oil (f) is in the range of preferably 20 to 800 cSt [$mm^2/s$], and more preferably 50 to 60 cSt [$mm^2/s$]. Here, the dynamic viscosity of the paraffin oil (f) is measured in accordance with JIS K-2283.

Also, the current point of the paraffin oil (f) is in the range of preferably −40 to 0° C., and more preferably −30 to 0° C. Here, the current point of the paraffin oil (f) is measured in accordance with JIS K-2269.

In addition, the flash point of the paraffin oil (f) is in the range of preferably 200 to 400° C., and more preferably 250 to 300° C. Here, the flash point of the paraffin oil (f) is measured in accordance with JIS K-2265.

By using a paraffin oil (f), a vinyl chloride polymer composition having improved flexibility can be obtained. Further, by using a paraffin oil (f) together with the above-described aromatic vinyl compound block copolymer (d), the resulting vinyl chloride polymer composition shows more improved flexibility and no migration of the paraffin oil.

The amount of the paraffin oil is, when used alone, preferably not more than 100 parts by weight based on 100 parts by weight of the block copolymer (b).

When the paraffin oil (f) is used together with the aromatic vinyl compound block copolymer (d), they are preferably used at a weight ratio, based on the weight of the vinyl chloride polymer (a) and the block copolymer (b), to meet the following equations (4), (5) and (6).

$$1/100 \leq Wb/(Wa+Wd+Wf) \leq 100/100 \qquad (4)$$

$$25/75 \leq Wd/Wf \leq 95/5 \qquad (5)$$

$$30/70 \leq Wa/(Wd+Wf) \leq 95/5 \qquad (6);$$

wherein Wa means the weight of the vinyl chloride polymer (a), Wb means the weight of the block copolymer (b), Wd means the weight of the aromatic vinyl compound block copolymer (d) and Wf means the weight of the paraffin oil (f).

By using the paraffin oil (f) and the aromatic vinyl compound block copolymer (d) in the above-described amount, a vinyl chloride polymer composition having excellent non-tackiness and processability and having extremely excellent flexibility can be obtained.

The weight ratio [Wa/(Wd+Wf)] of the vinyl chloride polymer (a), the paraffin oil (f) and the aromatic vinyl compound block copolymer (d) is in the range of preferably 40/60 to 90/10, and more preferably 50/50 to 85/15.

Also, the weight ratio [Wd/Wf] of the aromatic vinyl compound block copolymer (d) and the paraffin oil (f) is in the range of preferably 30/70 to 85/15, and more preferably 35/65 to 75/25.

In addition, the weight ratio [Wb/(Wa+Wd+Wf)] of the vinyl chloride polymer (a), the block copolymer (b), the paraffin oil (f) and the aromatic vinyl compound block copolymer (d) is in the range of preferably 2/100 to 60/100, more preferably 3/100 to 40/100, and still more preferably 3/100 to 25/100.

The vinyl chloride polymer composition of the present invention can optionally contain a styrene-based polymer (g) different from either of the block copolymer (b) or the aromatic vinyl compound block copolymer (d), within the extent where effects of the invention is retained. Also, the vinyl chloride polymer composition of the present invention can optionally contain an olefin-based polymer (h) other than the ethylene-α-olefin copolymer (e), within the extent where effects of the invention is retained. The amount of the styrene-based polymer (g) or the olefin-based polymer (h) is, in general, within the range of preferably 1 to 10% by weight based on the total weight of the vinyl chloride polymer (a) and the block copolymer (b). By blending such a styrene-based polymer (g) or an olefin-based polymer (h), the resulting vinyl chloride polymer composition may sometimes show improved properties such as non-tackiness and processability.

As the styrene-based polymer (g), one having a structural unit derived from a styrene monomer in an amount of 10 by weight or more is preferably used. The more preferred styrene-based polymer is that having a structural unit derived from a styrene monomer in an amount of 50% by weight or more. The styrene monomer can include styrene, α-methylstyrene, p-methylstyrene, p-tert-butylstyrene, 3,4-dimethylstyrene and the like. The styrene-based polymer (g) can contain one or more of the structural units derived from such a styrene monomer.

In addition, the styrene-based polymer (g) may contain a structural unit derived from a vinyl monomer other than the above-mentioned styrene monomer. Examples of the vinyl monomer other than the styrene monomer can include ones having a cyano group such as acrylonitrile and methacrylonitrile; C1–18 alkyl esters of acrylic acid or C1–18 alkyl esters of methacrylic acid such as methyl esters, ethyl esters, propyl esters, n-butyl esters, isobutyl esters, hexyl esters, 2-ethylhexyl esters, dodecyl esters and octadecyl esters; esters of acrylic acid or methacrylic acid and a diol such as ethylene glycol, propylene glycol or butanediol; vinyl esters of a carboxylic acid having 1 to 6 carbon atoms such as acetic acid or propionic acid; unsaturated carboxylic acids such as acrylic acid, methacrylic acid and maleic acid; unsaturated dicarboxylic anhydrides such as maleic anhydride; (meth)acrylamides such as acrylamide, methacrylamide and N,N-dimethylacrylamide; maleimide; N-substituted maleimides such as N-methylmaleimide, N-ethylmaleimide, N-phenylmaleimide and N-cyclohexylmaleimide; conjugated dienes such as butadiene and isoprene; and so on. The styrene-based polymer (g) may contain one or more of the structural units derived from such a vinyl monomer.

The olefin-based polymer (h) includes homopolymers of an olefin such as ethylene, propylene or butylene; copolymers of two or more of the above-mentioned olefins; and copolymers of one or more of the above-mentioned olefins and one or more of other vinyl monomers. Examples of the olefin-based polymer (h) can include low-density polyethylenes, medium-density polyethylenes, high-density polyethylenes, polypropylenes, polybutylenes, ethylene-vinyl acetate copolymers, ethylene-acrylic acid copolymers, ethylene-maleic anhydride copolymers, propylene-acrylic acid copolymers, propylene-maleic anhydride copolymers, isobutylene-maleic anhydride copolymers and the like. One or more of these olefin homopolymers or olefin copolymers can be used as the olefin-based polymer (h).

In addition, a styrene-based polymer (g) and an olefin-based polymer (h) can be used together, if required.

The vinyl chloride polymer composition of the present invention can optionally contain a thermosetting polyurethane resin, a polyamide resin, a polyester resin, a polyvinylidene chloride resin, a polycarbonate resin, an acrylic resin or a polyoxymethylene resin, within the extent where effects of the invention is retained.

In addition, the vinyl chloride polymer composition of the present invention can optionally contain an additional component, examples of which include stabilizers for the vinyl chloride polymer (a) such as metallic soaps of calcium stearate, zinc stearate, barium stearate, cadmium stearate and lead stearate; inorganic stabilizers such as dibasic sulfates, dibasic lead stearate, calcium hydroxide and calcium silicate; additives such as lubricants, pigments, impact modifiers, processing materials, nucleating agents, reinforcing agents, colorants, flame retardants, weatherability modifiers, ultraviolet absorbents, antioxidants, hydrolysis inhibitors, antifungal agents, light stabilizers, antistatic agents, a silicone oil, anti-blocking agents, forming agents and perfumes; fibers such as glass fibers and polyester fibers; fillers such as talc, silica and wood powder; various coupling agents, and the like.

The vinyl chloride polymer composition of the present invention can be produced by a process in which the above-described components can be uniformly blended. Among them, a melt kneading process is simple and preferred.

The vinyl chloride polymer composition of the present invention can be produced by, for example, melt kneading the respective components with a melt kneading machine such as a single-screw extruder, a twin-screw extruder, a kneading machine, a mixing roll or a Banbury mixer, generally at a temperature of 120 to 220° C. for about 30 seconds to 5 minutes. The blending sequence of the respective components has no particular restriction on melt kneading.

The vinyl chloride polymer composition of the present invention can be produced, for example, by the following procedures.

[I] The production of a composition containing a vinyl chloride polymer (a) and a block copolymer (b).
(I-1) A vinyl chloride polymer (a) and a block copolymer (b) [or the above-described block copolymer composition] are simultaneously fed into a melt kneading machine for kneading.
(I-2) A block copolymer (b) [or the above-described block copolymer composition] is produced by melt kneading, to which a vinyl chloride polymer (a) is added, for melt kneading, therewith.
(I-3) The production of a block copolymer (b) [or the above-described block copolymer composition] is carried out in the presence of a vinyl chloride polymer (a).

[II] The production of a composition containing a vinyl chloride polymer (a), a block copolymer (b) and an ethylene-α-olefin copolymer (e).
(II-1) A vinyl chloride polymer (a), an ethylene-α-olefin. copolymer (e) and a block copolymer (b) [or the above-described block copolymer composition] are simultaneously fed into a melt kneading machine for kneading.
(II-2) An ethylene-α-olefin copolymer (e) and a block copolymer (b) [or the above-described block copolymer composition] are melt-kneaded to give a composition. Then, the resulting composition and a vinyl chloride polymer (a) are melt-kneaded.
(II-3) The production of a block copolymer (b) [or the above-described block copolymer composition] is carried out in the presence of a vinyl chloride polymer (a) and an ethylene-α-olefin copolymer (e).
(II-4) The production of a block copolymer (b) [or the above-described block copolymer composition] is carried out in the presence of an ethylene-α-olefin copolymer (e). Then, the resulting composition and a vinyl chloride polymer (a) are melt-kneaded.

[III] The production of a composition containing a vinyl chloride polymer (a), a block copolymer (b), a paraffin oil (f) and an aromatic vinyl compound block copolymer (d).
(III-1) A vinyl chloride polymer (a), an aromatic vinyl compound block copolymer (d), a paraffin oil (f) and a block copolymer (b) [or the above-described block copolymer composition] are simultaneously fed into a melt kneading machine for kneading.
(III-2) An aromatic vinyl compound block copolymer (d), a paraffin oil (f) and a block copolymer (b) [or the above-described block copolymer composition] are melt-kneaded to give a composition. Then, the resulting composition and a vinyl chloride polymer (a) are melt-kneaded.
(III-3) The production of a block copolymer (b) [or the above-described block copolymer composition] is carried out in the presence of an aromatic vinyl compound block copolymer (d). To the resulting composition, a paraffin oil (f) is blended, and then a vinyl chloride polymer (a) is melt-kneaded therein.
(III-4) A vinyl chloride polymer (a), an aromatic vinyl compound block copolymer (d) and a block copolymer (b) [or the above-described block copolymer composition] are melt-kneaded to give a composition. Then, to the resulting composition, a paraffin oil (f) is blended.
(III-5) The production of a block copolymer (b) [or the above-described block copolymer composition] is carried out in the presence of a vinyl chloride polymer (a) and an aromatic vinyl compound block copolymer (d). Then, to the resulting composition, a paraffin oil (f) is blended.

(III-6) A vinyl chloride polymer (a), an aromatic vinyl compound block copolymer (d) and a paraffin oil (f) are melt-kneaded to give a composition. Then, the resulting composition and a block copolymer (b) [or the above-described block copolymer composition] are melt-kneaded.

(III-7) A vinyl chloride polymer (a) and a block copolymer (b) [or the above-described block copolymer composition] are melt-kneaded to give a composition. Then, to the resulting composition, an aromatic vinyl compound block copolymer (d) and a paraffin oil (f) are supplied for melt kneading.

(III-8) The production of a block copolymer (b) [or the above-described block copolymer composition] is carried out in the presence of a vinyl chloride polymer (a). Then, to the resulting composition, an aromatic vinyl compound block copolymer (d) and a paraffin oil (f) are supplied for melt kneading.

(III-9) A vinyl chloride polymer (a) and an aromatic vinyl compound block copolymer (d) are melt-kneaded to give a composition. Then, to the resulting composition, a paraffin oil (f) and a block copolymer (b) [or the above-described block copolymer composition] are supplied for melt kneading.

(III-10) A paraffin oil (f) is blended with a block copolymer (b) [or the above-described block copolymer composition] to give a composition. Then, to the resulting composition, a vinyl chloride polymer (a) and an aromatic vinyl compound block copolymer (d) are supplied for melt kneading.

(III-11) A paraffin oil (f) is blended with an aromatic vinyl compound block copolymer (d) to give a composition. Then, to the resulting composition, a vinyl chloride polymer (a) and a block copolymer (b) [or the above-described block copolymer composition] are supplied for melt kneading.

(III-12) A composition containing a vinyl chloride polymer (a) and a block copolymer (b) [or the above-described block copolymer composition], and a composition containing an aromatic vinyl compound block copolymer (d) and a paraffin oil (f) are respectively prepared. Then, two kinds of the resulting compositions are melt-kneaded.

(III-13) A composition containing a vinyl chloride polymer (a) and an aromatic vinyl compound copolymer (d), and a composition containing a block copolymer (b) [or the above-described block copolymer composition] and a paraffin oil (f) are respectively prepared. Then, two kinds of the resulting compositions are melt-kneaded.

A thermoplastic polyurethane (c), a styrene-based polymer (g), an olefin-based polymer (h) and the above-described additional components may be blended during the preparation or after the preparation of the vinyl chloride polymer composition. When they are blended during the preparation of the vinyl chloride polymer composition, the thermoplastic polyurethane (c), the styrene-based polymer (g), the olefin-based polymer (h) or the above-described additional components may be fed into a melt kneading machine for kneading separately from the vinyl chloride polymer (a), the block copolymer (b) [or the above-described block copolymer composition], the ethylene-α-olefin copolymer (e), the paraffin oil (f) and the aromatic vinyl compound block copolymer (d). Alternatively, they can be fed into a melt kneading machine for kneading as a compound with at least one of the vinyl chloride polymer (a), the block copolymer (b) [or the above-described block copolymer composition], the ethylene-α-olefin copolymer (e), the paraffin oil (f) and the aromatic vinyl compound block copolymer (d). In the preferred embodiments, they are fed into a melt kneading machine for kneading as a compound with the block copolymer (b) [or the above-described block copolymer composition].

The vinyl chloride polymer composition of the present invention can be subjected to a melt molding or a thermal processing. By using a vinyl chloride polymer composition of the present invention, a variety of articles can be obtained smoothly by various molding methods such as extrusion molding, injection molding, press molding, blow molding, calendar molding, casting, and so on. The vinyl chloride polymer composition of the present invention can give a molded article having excellent properties such as non-tackiness, flexibility and mechanical properties.

By taking advantages of the above-described characteristics, the vinyl chloride polymer composition of the present invention can be applied for various uses including, for example, various household goods such as raincoats, umbrellas, rain pants, rain shoes and caps; various keyboards; laminates; various films or sheets for various containers; agricultural articles such as plastic hothouses; sheet forming products such as handbags, wallets and stationery; footwear articles such as sandal bands and slippers; belts; interior decorative articles such as wall covering materials and cushiony floors; toys such as dolls and floats; leather goods for automobiles, for furniture, for bags or for apparel; wire covering materials; extruded products such as gas pipes, hoses, and tubes; automobile components such as steering wheels; machine parts; watchbands; and packing materials.

Further, the vinyl chloride polymer composition of the present invention has, in addition to the above-described characteristics, excellent melt-adhesiveness to various materials and, therefore, can be firmly adhered, under it's molten state, to various other materials including, for example, synthetic resins, rubbers, metals, woods, ceramics, paper, and fabrics. Thus, the vinyl chloride polymer composition of the present invention can be effectively used, especially, for the production of composite articles with a member comprising such other materials.

Examples of such other materials include various thermoplastic resins, various compositions comprising thermoplastic resins other than the vinyl chloride polymer composition of the present invention, thermosetting resins, papers, fabrics, metals, woods, ceramics and the like.

The vinyl chloride polymer composition of the present invention is excellent in melt-adhesiveness particularly to the materials having polarity. Examples of the materials having polarity include polyurethane resins; polyamide resins; polyester resins; polyvinylidene chloride resins; polyvinyl chloride resins; vinyl chloride-vinyl acetate copolymers; epoxy resins; polycarbonate resins; polyphenylenesulfide resins; (meth)acrylic resins; polyoxymethylene resins; polysulfone resins; saponified ethylene-vinyl acetate copolymers; resins such as copolymers of aromatic vinyl compounds and vinyl cyanide compounds or compositions containing them; various synthetic rubbers such as butadiene-acrylonitrile rubbers, chloroprene rubbers, urethane rubbers, silicone rubbers, fluorocarbon rubbers and acrylonitrile rubbers; and various metals such as iron, aluminum and copper.

The composite articles are typically laminate structures such as films and sheets. They can include tubes, profiles and articles having various three-dimensional forms.

The laminate structures comprising the vinyl chloride polymer composition of the present invention has no particular restriction on the number of layers, the thickness of each layer, the shape, the configuration and the like, which can be appropriately adjusted according to the intended purpose of the laminate and so on.

Representative examples of the laminate structures comprising the vinyl chloride polymer composition of the present invention include, but are not limited thereto, a two-layered laminate structure having a layer of the vinyl chloride polymer composition of the present invention and a layer of another material, a three-layered laminate structure having a inner layer of the vinyl chloride polymer composition of the present invention between two outer layers [surface layers] of other materials, a three-layered laminate structure where two layers of the vinyl chloride polymer composition of the present invention are laminated on both surfaces of a layer of another material, or a four or more-layered laminate structure in which a layer of the vinyl chloride polymer composition of the present invention and a layer of one or more of other materials are alternately stacked.

When the laminate structure has two or more of the layers of other materials, each material may be the same or different. In addition, when the laminate structure has two or more of the layers of the vinyl chloride polymer composition of the present invention each vinyl chloride polymer composition of the present invention may be the same or different.

The composite articles can be produced by a process in which a melt-adhesiveness is utilized. Examples of the process include melt molding methods of injection moldings such as insert injection molding, two-color injection molding, core back injection molding, sandwich injection molding and injection press molding; extrusion moldings such as T-die laminate molding, co-extrusion molding, extrusion coating and profile extrusion; blow molding; calendar molding; press molding; melt casting and the like.

When the composite articles are produced by insert injection molding, the following process is generally employed. Namely, other material, previously prepared, having a prescribed shape and size is disposed in a mold, and the vinyl chloride polymer composition of the present invention is injected therein to give a composite article having a member comprising the vinyl chloride polymer composition of the present invention and a member comprising the other material. In this case, there is no particular restriction on the preparation method for the other material to be disposed in a mold. When the other material to be disposed in a mold is the material comprising a synthetic resin or a rubber, it is possible to employ various molding methods of, for example, injection molding, extrusion molding, press molding and casting. Whereas, when the other material to be disposed in a mold is the material comprising a metal, it is possible to employ, for example, the methods generally applied for the manufacture of a metal product, such as casting, rolling, cutting, machining and grinding.

When the composite articles are produced by two-color injection molding, the following process is generally employed. Namely, the other material is injected into a mold to form a member, then the cavity plate is exchanged, for example, by the rotation or the movement of the mold, and the vinyl chloride polymer composition of the present invention is injected into the gap between the member comprising the other material and the second mold plate to give a composite article. In this process, two or more of injection molding machines are employed.

Whereas, when the composite articles are produced by core back injection molding, the following process is generally employed. Namely, by the use of one injection molding machine and one mold, the other material is injected into the mold to form a member, then the cavity of the mold is enlarged, and the vinyl chloride polymer composition of the present invention is injected therein to give a composite article.

Alternatively, the composite articles may be produced in the following manner. Namely, in the above-described injection moldings, the injection sequence of the components is exchanged. Thus, the vinyl chloride polymer composition of the present invention is first injected into the mold to form a member, and the other material such as a thermoplastic resin is injected therein.

When the composite articles are produced by extrusion moldings, the following process or the like is generally employed. Namely, the vinyl chloride polymer composition of the present invention and the other material such as a thermoplastic resin are simultaneously melt-extruded and joined to each other, through a die [extrusion die portion, or the like] divided into not less than two parts, examples of which are the inner side and the outer side, the upper side and the lower side, or the left-hand side and the right-hand side. If the other material is not a thermoplastic material, the composite articles can be produced by extrusion coating of the vinyl chloride polymer composition of the present invention to above or around the other material.

Further, when the composite articles are produced by calendar molding, they can be produced by the calendar coating of the vinyl chloride polymer composition of the present invention at a molten state onto the other material which may be in the molten and plastic state, or in the solid state.

Still further, when the composite articles are produced by press molding, they can be produced by the melt pressing of the vinyl chloride polymer composition of the present invention with the disposed other material.

The composite articles comprising the vinyl chloride polymer composition of the present invention can be applied for various uses such as industrial goods according to the kind of the other material or the characteristics of the member comprising the vinyl chloride polymer composition or the other material. The composite articles can be applied for various kinds of interior automotive trims such as instrument panels, center panels, center console boxes, door trims, pillars, assist grips, steering wheels and airbag covers; automobile exterior parts such as protector moldings and bumpers; electrical household parts such as bumpers of vacuum cleaners, door stops of the refrigerator, camera grips, electrical machinery grips, remote control switches and various kinds of key tops of office automation equipments; sports goods such as swimming goggles; various kinds of cover parts; various industrial components with packing for the use of sealing, sound insulation or vibration damping; electronic parts such as curled cord wire coverings; various films for food, medical care, agriculture and packaging; building materials such as door stops, window frames, wall papers and decorative laminates; electrical and electronic parts such as belts, hoses, tubes, mats, sheets and soundness gears; various joints and valves.

EXAMPLES

The present invention will be explained more specifically with reference to examples but the present invention is not restricted at all to such examples.

In the following Examples and Comparative Examples, the hardness, the non-tackiness, the flexibility and the mechanical properties [yield strength and elongation at yield point] of the molded articles comprising the vinyl chloride polymer composition, and the adhesion strength in the laminate structure comprising the vinyl chloride polymer composition were measured and evaluated according to the following methods.

(1) Hardness

Each vinyl chloride polymer composition obtained in Examples and Comparative Examples was molten at 150° C. for 2 minutes by means of a press molding machine ["compression molding machine AYS-10", trade name, made by Shinto Metal Industries, Ltd.]. Then, the molten product was held under the load of 50 kgf at 150° C. for 30 seconds to give a molded article [test piece] with a thickness of about 2 mm.

Two of the molded articles [test pieces] were stacked one on another, and tested for the Shore A hardness of the molded article [test piece] in accordance with the method of JIS K-6301.

(2) Non-tackiness

Fifty plates of the molded articles [test pieces] obtained in the above-described test method (1) were stacked into one piece without releasing paper, and allowed to stand at room temperature for 1 week. Then, the degree of tackiness between the molded articles when they were peeled off one by one was observed, so that the non-tackiness was evaluated according to the following standards.

Evaluation Standards of Non-tackiness

○: The molded articles can be easily and smoothly peeled off one by one, because no sticking occurs.

Δ: A sticking is observed. However, the molded articles can be peeled off with a force application.

X: It is impossible for the molded articles to be peeled off one by one even with a force application, because they are firmly stuck to each other.

(3) Flexibility

The molded article [test piece] obtained in the above-described test method (1) was allowed to stand at 25° C. for 2 days. Then, it was bent to 180 degrees. The bent portion was visually observed and evaluated according to the following standard. Here, the whitening on bending corresponds to the occurrence of boundary separation.

Evaluation Standards of Flexibility

⊚: No change is observed, and the flexibility is good

○: Whitening on bending is slightly observed at the bent portion.

X: Remarkable whitening on bending is observed at the bent portion.

(4) Mechanical Properties [Yield Strength and Elongation at Yield Point]

The molded article [test piece] obtained in the above-described test method (1) was allowed to stand at 25° C. for 2 days. Then, it was punched into JIS No. 3 Dumbbell shape and tested for the yield strength and the elongation at yield point using "Autograph IS-500D" [trade name, made by Shimadzu Corporation] under the condition of a tensile speed of 300 mm/minutes at room temperature according to the method of JISK-7311.

(5) Adhesion Strength in a Laminate Structure

The vinyl chloride polymer composition obtained in Examples or Comparative Examples was stacked on a molded article [thickness of 2 mm] of a rigid polyvinyl chloride resin composition [PVC-C] shown below. Then, they were molten at 170° C. for 2 minutes with a press molding machine ["compression molding machine "AYS-10", trade name, made by Shinto Metal Industries, Ltd.] and press bonded to each other under the load of 50 kgf at 170° C. for 30 seconds to give a laminate structure.

The resulting laminate structure was cut into a test piece [size: 1 cm×8 cm] and tested for the adhesion strength between a layer of the vinyl chloride polymer composition, obtained in Examples or Comparative Examples, and a layer of the rigid polyvinyl chloride resin composition according to a 180 degrees peeling test using "Autograph IS-500D" [trade name, made by Shimadzu Corporation] under the condition of a peeling speed of 300 mm/minutes at room temperature.

When the adhesion strength between the layers is very strong and the respective layers cannot be peeled resulting to the failure of conducting the peeling test, it is evaluated as "Impossible to peel". On the other hand, when the adhesion strength between the layers is very weak and the respective layers can be readily delaminated by hands, it is evaluated as "Readily peeled".

(6) Non-migration

The molded article [test piece] obtained in the above-described test method (1) was stacked on a molded article [thickness of 2 mm] of the rigid polyvinyl chloride resin composition, and the stack was allowed to stand under the load of 0.5 kgf at 70° C. for 24 hours. After the molded articles were separated from each other, the presence or absence of migration substances onto the surface of the molded article of the rigid polyvinyl chloride resin composition was visually observed. The one which showed no trace of migration was evaluated as "○" while the one which showed a trace of migration was evaluated as "X".

Abbreviations and properties of the compounds as referred to in the following Examples and Comparative Examples are as follows.

[Vinyl Chloride Polymer]

PVC: Polyvinyl chloride having a degree of polymerization of 1,000 ["TK 1000", trade name, made by Shin-Etsu Chemical Co., Ltd.]

[Rigid Polyvinyl Chloride Resin Compound]

PVC-C: A rigid polyvinyl chloride resin compound comprising 100 parts by weight of the polyvinyl chloride having a degree of polymerization of 1,000, 15 parts by weight of a copolymer of methyl methacrylate, butadiene and styrene [MBS resin; "Metablen C-303A", trade name, made by Mitsubishi Rayon Co., Ltd.], 2 parts by weight of an organic tin stabilizer ["KS-1000", trade name, made by Kyodo Chemical Co., Ltd.] and 1.5 parts by weight of a lubricant ["Wax OP", trade name, Clariant (Japan) K.K.].

[Ethylene-α-olefin copolymers]

POE-A: Ethylene-1-octene copolymer ["ENGAGE EG8200", trade name, made by DuPont Dow Elastomers Limited; Ethylene unit/1-octene unit=92/8 (molar ratio); MFR (at 190° C., under the load of 2.16 kg): 4.2 g/10 minutes; Shore A hardness: 75; Density: 0.870 g/cm$^3$; Mooney viscosity: 12.1 $ML_{1+4}$ (100° C.)]

POE-B: Ethylene-1-octene copolymer ["ENGAGE EG8842", trade name, made by DuPont Dow Elastomers Limited; Ethylene unit/1-octene unit=83/17 (molar ratio); MFR (at 190° C., under the load of 2.16 kg): 1.0 g/10 minutes; Shore A hardness: 51; Density: 0.857 g/cm$^3$; Mooney viscosity: 37.2 $ML_{1+4}$ (100° C.)]

POE-C: Ethylene-1-octene copolymer ["ENGAGE EG8100", trade name, made by DuPont Dow Elastomers Limited; Ethylene unit/1-octene unit=93/7 (molar ratio); MFR (at 190° C., under the load of 2.16 kg): 1.0 g/10 minutes; Shore A hardness: 75; Density: 0.870 g/cm$^3$; Mooney viscosity: 35.6 $ML_{1+4}$ (100° C.)]

[Functionality Block Copolymers]

F-SEEPS: Hydrogenated tri-block copolymer having a hydroxyl group on one terminal of the molecule comprising polystyrene block-copolymer block of isoprene and butadiene-polystyrene block [number average molecular weight: 50,000, styrene content: 30% by weight, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %, average number of hydroxyl group per molecule: 0.9], which was prepared by using styrene, isoprene and butadiene as raw materials according to the method described in the Referential Example 1 of the Japanese Patent Application Laid-open No. Hei 10-139963.

F-SEEPS consists "SEEPS-OH" which is a hydrogenated tri-block copolymer having a hydroxyl group on one terminal of the molecule comprising polystyrene block-copolymer block of isoprene and butadiene-polystyrene block [number average molecular weight: 50,000, styrene content: 30% by weight, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %] and "SEEPS-1" which is a hydrogenated tri-block copolymer having no hydroxyl group on the molecule comprising polystyrene block-copolymer block of isoprene and butadiene-polystyrene block [number average molecular weight: 50,000, styrene content: 30% by weight, hydrogenation ratio in the copolymer block of isoprene and butadiene: 98%, molar ratio of isoprene and butadiene: 50/50, 1,2- and 3,4-bond content in the copolymer block of isoprene and butadiene: 8 mol %] at a molar ratio of SEEPS-OH/SEEPS-1=9/1.

F-HVSIS: Hydrogenated tri-block copolymer having a hydroxyl group on one terminal of the molecule comprising polystyrene block-polyisoprene block-polystyrene block [average number of hydroxyl group per molecule: 0.8, styrene content: 25% by weight, number average molecular weight: 80,000, hydrogenation ratio in the polyisoprene block: 85%, 1,4-bond content in the polyisoprene block: 45 mol %, 1,2- and 3,4-bond content in the polyisoprene block: 55 mol %, MFR value (at 230° C., under the load of 2.16 kg): 6 g/10 minutes].

F-HVSIS consists "HVSIS-OH" which is a hydrogenated tri-block copolymer having a hydroxyl group on one terminal of the molecule comprising polystyrene block-polyisoprene block-polystyrene block [number average molecular weight: 80,000, styrene content: 25% by weight, hydrogenation ratio in the polyisoprene block: 85%, 1,4-bond content in the polyisoprene block: 45 mol %, 1,2- and 3,4-bond content in the polyisoprene block: 55 mol %] and "HVSIS" which is a hydrogenated tri-block copolymer having no hydroxyl group on the molecule comprising polystyrene block-polyisoprene block-polystyrene block [number average molecular weight: 80,000, styrene content: 25% by weight, hydrogenation ratio in the polyisoprene block: 85%, 1,4-bond content in the polyisoprene block: 45 mol %, 1,2- and 3,4-bond content in the polyisoprene block: 55 mol %] at a molar ratio of HVSIS-OH/HVSIS=8/2.

F-HVSIS was prepared by, according to the method described in the Referential Example 2 of the Japanese Patent Application Laid-open No. Hei 7-118492, polymerizing styrene and isoprene successively under the presence of tetramethylethylenediamine in cyclohexane using sec-butyl lithium followed by the addition of ethylene oxide to give a block copolymer having a hydroxyl group at the terminal of the molecule, and subjecting the block copolymer to hydrogenation using a Ziegler catalyst.

[Aromatic Vinyl Compound Block Copolymers]

SEPS: Hydrogenated tri-block copolymer comprising polystyrene block-polyisoprene block-polystyrene block ["Septon 2002", trade name, made by KURARAY Co., Ltd.]

SEEPS-2: Hydrogenated tri-block copolymer comprising polystyrene block-copolymer block of isoprene and butadiene-polystyrene block ["Septon 4033", trade name, made by KURARAY Co., Ltd.]

[Paraffin Oil]

PL: Paraffin type of process oil ["Diana Process Oil PW-380", trade name, made by IDEMITSU KOSAN CO., LTD.; Dynamic viscosity: 381.6 cSt (40° C.); current point: −15° C.; flash point: 300° C.]

[Thermoplastic Polyurethane]

TPU: A polyurethane having a content of nitrogen atom of 1.9% by weight prepared by 1,4-butnediol, 4,4'-diphenylmethane diisocyanate and a polyester diol having a number average molecular weight of 3,500 which is obtained by the reaction of 3-methyl-1,5-pentanediol and adipic acid. This TPU was prepared according to the method described in the Example 2 of the Japanese Patent Application Laid-open No. Sho 47-34494.

[High Polymer Polyol]

POH-1: Polyester diol having a number average molecular weight of 3,500 prepared by the reaction of 3-methyl-1, 5-pentanediol and adipic acid ["Kuraray Polyol P-3500", trade name, made by KURARAY Co., Ltd.]

[Chain Extender]

BD: 1,4-butanediol

[Organic Diisocyanate]

MDI: 4,4'-diphenylmethane diisocyanate

[Catalyst for Polyurethane Forming Reaction]

CAT: Dibutyltin diacetate

The "PU/SEEPS" prepared by the following Referential Example was used as the block copolymer (b).

Referential Example 1

100 parts by weight of the TPU and 100 parts by weight of the F-SEEPS were premixed. The resulting mixture was melt-kneaded using a twin-screw extruder ["BT-30", trade name, made by Research Laboratory of Plastics Technology Co., Ltd.; 30 mm φ; L/D=36] with coaxial screws, under the conditions of a cylinder temperature of 220° C. and a screw rotation speed of 150 rpm. The reaction mixture in melt was continuously extruded into water as a strand, and the resulting strands were cut in pellets with a palletizing machine. The resulting pellets were dried at 80° C. for 4 hours to give a block copolymer compound A [PU-SEEPS Compound A].

From the block copolymer composition A [PU-SEEPS Compound A], the polyurethane contained therein was extracted with dimethylformamide; and thereafter, the SEEPS-1 and the unreacted SEEPS-OH were extracted with cyclohaxane. The remaining solid was dried to give a block copolymer. $^1$H-NMR analysis showed that the block copolymer was a di-block copolymer having one polymer block (I)

comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 1,4-butanediol unit. The block copolymer is referred to as "PU/SEEPS".

The amounts of the polyurethane, which was extracted with dimethylformamide, the SEEPS-OH and the SEEPS-1, which were extracted with cyclohexane, were 82.5 parts by weight of the polyurethane, 55 parts by weight of the SEEPS-OH and 12.5 parts by weight of the SEEPS-1, respectively, based on 100 parts by weight of the PU/SEEPS.

The polymer block (I) of the PU/SEEPS had the same profiles as those of the SEEPS-1.

Example 1

The PU/SEEPS was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 1. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 1.

Comparative Examples 1 and 2

F-SEEPS or SEPS was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 1. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 1.

Example 2

The block copolymer compound A [PU-SEEPS Compound A] obtained in the Referential Example 1 was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 1. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 1.

TABLE 1

| | Examples | | Comparative Examples | |
|---|---|---|---|---|
| | 1 | 2 | 1 | 2 |
| Composition [Part by weight] | | | | |
| PVC | 60 | 50 | 50 | 50 |
| PU/SEEPS | 40 | | | |
| PU-SEEPS Compound A | | 50 | | |
| F-SEEPS | | | 50 | |
| SEPS | | | | 50 |
| Properties of the molded article | | | | |
| Hardness [Shore A] | 94 | 93 | 93 | 94 |
| Non-tackiness | ○ | ○ | ○ | ○ |
| Flexibility | ◎ | ◎ | ○ | ○ |
| Mechanical properties | | | | |
| Yield strength [kgf/cm$^2$] | 150[1] | 125[1] | 70 | 64 |
| Elongation at yield point [%] | 150[1] | 150[1] | 67 | 70 |
| Non-migration | ○ | ○ | ○ | ○ |
| Adhesion strength of the laminate structure | Impossible to peel | Impossible to peel | Impossible to peel | Impossible to peel |
| Adhesion strength [kgf/cm] | | | | |

Note:
[1]Tensile strength at break and elongation at break are shown, because the test piece was broken before reaching to the yield point.

Examples 3 to 5

The PU/SEEPS and the POE-A or the POE-B were premixed in an amount shown in Table 2. The resulting mixture was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 2. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 2.

Comparative Examples 3 and 4

The POE-A or the POE-B was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 2. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 2.

Examples 6 and 7

The block copolymer composition A [PU-SEEPS Compound A] obtained in the Referential Example 1 and the POE-A or the POE-C were premixed in an amount shown in Table2. The resulting premix was molten at 140° C. under nitrogen with a kneading machine [Labo Plastomill 20R200", trade name, made by Toyo Seiki Seisaku-sho Ltd]. To the resulting melt, the PVC was blended in an amount shown in Table 2. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 2.

Examples 8 and 9

The SEEPS-2, the PL and the PU/SEEPS were premixed in an amount shown in Table 3. The resulting mixture was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 3. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 3.

Comparative Example 5

The SEEPS-2 and the PL were premixed in an amount shown in Table 3. The resulting mixture was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 3. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 3.

Example 10

The block copolymer composition A [PU-SEEPS Compound A] obtained in the Referential Example 1, the SEEPS-2 and the PL were premixed in an amount shown in Table 3. The resulting mixture was molten at 140° C. under nitrogen with a kneading machine ["Labo Plastomill 20R200", trade name, made by Toyo Seiki Seisaku-sho Ltd]. To the resulting melt, the PVC was blended in an amount shown in Table 3. The resulting blend was melt-kneaded at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 3.

TABLE 2

|  | Examples | | | | | Comparative Examples | |
|---|---|---|---|---|---|---|---|
|  | 3 | 4 | 5 | 6 | 7 | 3 | 4 |
| Composition [Part by weight] | | | | | | | |
| PVC | 100 | 100 | 100 | 100 | 100 | 100 | 100 |
| POE-A | 100 | | | 100 | | 100 | |
| POE-B | | 100 | 45 | | | | 100 |
| POE-C | | | | | 100 | | |
| PU/SEEPS | 20 | 35 | 20 | | | | |
| PU-SEEPS Compound A | | | | 50 | 50 | | |
| Properties of the molded article | | | | | | | |
| Hardness [Shore A] | 89 | 85 | 92 | 88 | 90 | 90 | 78 |
| Non-tackiness | ○ | ○ | ○ | ○ | ○ | Δ | Δ |
| Flexibility | ⊚ | ⊚ | ⊚ | ⊚ | ⊚ | X | X |
| Mechanical properties | | | | | | | |
| Yield strength [kgf/cm$^2$] | 47 | 42 | 80 | 48 | 60 | 37 | 21 |
| Elongation at yield point [%] | 150 | 100 | 100 | 125 | 150 | 33 | 33 |
| Non-migration | ○ | ○ | ○ | ○ | ○ | ○ | ○ |
| Adhesion strength of the laminate structure | Impossible to peel | Impossible to peel | Impossible to peel | Impossible to peel | Impossible to peel | Redily Peeled | Redily Peeled |
| Adhesion strength [kgf/cm] | | | | | | | |

TABLE 3

|  | Examples | | | Comparative Example |
|---|---|---|---|---|
|  | 8 | 9 | 10 | 5 |
| Composition [Part by weight] | | | | |
| PVC | 100 | 100 | 100 | 100 |
| SEEPS-2 | 33 | 50 | 33 | 50 |

TABLE 3-continued

|  | Examples | | | Comparative Example |
| --- | --- | --- | --- | --- |
|  | 8 | 9 | 10 | 5 |
| PL | 33 | 50 | 33 | 50 |
| PU/SEEPS | 17 | 50 |  |  |
| PU-SEEPS |  |  | 17 |  |
| Compound A |  |  |  |  |
| Properties of the molded article |  |  |  |  |
| Hardness [Shore A] | 82 | 71 | 81 | 71 |
| Non-tackiness | ○ | ○ | ○ | Δ |
| Flexibility | ⊙ | ⊙ | ⊙ | X |
| Mechanical properties |  |  |  |  |
| Yield strength [kgf/cm$^2$] | 37 | 32[1] | 38 | 18[1] |
| Elongation at yield point [%] | 150 | 200[1] | 150 | 250[1] |
| Non-migration | ○ | ○ | ○ | ○ |
| Adhesion strength of the laminate structure | Impossible to peel | Impossible to peel | Impossible to peel | Readily peeled |
| Adhesion strength [kgf/cm] |  |  |  |  |

Note:
[1]Tensile strength at break and elongation at break are shown, because the test piece was broken before reaching to the yield point.

Example 11

A high polymer polyol [POH-1] containing 15 ppm of dibutyltin diacetate [catalyst for polyurethane forming reaction], a chain extender [BD] and an organic diisocyanate [MDI] were fed into the feed zone of a twin-screw extruder [30 mm f, L/D=36; the heating zone is divided into the feed zone, the compression zone and the metering zone] with coaxial screws, wherein their molar ratio of POH-1:BD:MDI was 1.0:2.0:3.0 [nitrogen atom content: 1.9% by weight] and their total feed rate was 100 g/minutes, and continuously melt-polymerized at 260° C. to effect a polyurethane formation. A functionality block copolymer [F-SEEPS] was continuously fed into the compression zone of the twin-screw extruder at a feed rate of 100 g/minutes to effect the reaction with the resulting product of the above-described polyurethane formation. The resulting melt was continuously extruded into water as a strand, and the resulting strands were cut in pellets with a palletizing machine. The resulting pellets were dried at 80° C. for 4 hours to give the block copolymer composition B [PU-SEEPS Compound B].

A part of the block copolymer composition B [PU-SEEPS Compound B] was sampled and the polyurethane contained therein was extracted there from with dimethyl formamide. Next, the SEEPS-1 and the unreacted SEEPS-OH were extracted from the sample with cyclohaxane. The remaining solid was dried to give a block copolymer B. $^1$H-NMR analysis showed that the block copolymer B was adi-block copolymer having one polymer block (I) comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated copolymer block of isoprene and butadiene-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the SEEPS-OH, the SEEPS-1 and the tri-block copolymer, which were extracted with cyclohexane, were 183 parts by weight of the polyurethane, 0 part by weight of the SEEPS-OH, 22 parts by weight of the SEEPS-1 and 130 parts by weight of the tri-block copolymer, respectively, based on 100 parts by weight of the di-block copolymer.

Each of the polymer blocks (I) of the di-block copolymer and the tri-block copolymer had the same profiles as those of the SEEPS-1. The number average molecular weight of the di-block copolymer was 85,000. Also, The number average molecular weight of the tri-block copolymer was 102,000.

100 parts by weight of the PVC and 100 parts by weight of the block copolymer composition B [PU-SEEPS Compound B] were melt-kneaded with a kneading machine ["Labo Plastomill 20R200", trade name, made by Toyo Seiki Seisaku-sho Ltd] at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 4.

Example 12

A high polymer polyol [POH-1] containing 15 ppm of dibutyltin diacetate [catalyst for polyurethane forming reaction], a chain extender [BD] and an organic diisocyanate [MDI] were fed into the feed zone of a twin-screw extruder [30 mm f, L/D=36; the heating zone is divided into the feed zone, the compression zone and the metering zone] with coaxial screws, wherein their molar ratio of POH-1:BD:MDI was 1.0:2.0:3.0 [nitrogen atom content: 1.9% by weight] and their total feed rate was 100 g/minutes, and continuously melt-polymerized at 260° C. to effect a polyurethane formation. A functionality block copolymer [F-HVSIS] was continuously fed into the compression zone of the twin-screw extruder at a feed rate of 100 g/minutes to effect the reaction with the resulting product of the above-described polyurethane formation. The resulting melt was continuously extruded into water as a strand, and the resulting strands were cut in pellets with a palletizing machine. The resulting pellets were dried at 80° C. for 4 hours to give the block copolymer composition C [PU-HVSIS Compound C].

A part of the block copolymer composition C [PU-HVSIS Compound C] was sampled and the polyurethane contained therein was extracted therefrom with dimethylformamide. Next, the HVSIS and the unreacted HVSIS-OH were extracted from the sample with cyclohaxane. The remaining solid was dried to give a block copolymer C. $^1$H-NMR analysis showed that the block copolymer C was a di-block copolymer having one polymer block (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit. In addition, GPC analysis showed that the extract by cyclohexane contained a tri-block copolymer having two polymer blocks (I) comprising polystyrene block-hydrogenated polyisoprene block-polystyrene block and one polymer block (II) comprising a polyurethane of poly(3-methyl-1,5-pentanediol adipate) unit, 4,4'-diphenylmethane diisocyanate unit and 1,4-butanediol unit.

The amounts of the polyurethane, which was extracted with dimethylformamide, the HVSIS-OH, the HVSIS and the tri-block copolymer, which were extracted with cyclohexane, were 182 parts by weight of the polyurethane, 0 part by weight of the HVSIS-OH, 45 parts by weight of the HVSIS and 127 parts by weight of the tri-block copolymer, respectively, based on 100 parts by weight of the di-block copolymer.

Each of the polymer blocks (I) of the di-block copolymer and the tri-block copolymer had the same profiles as those of the HVSIS. The number average molecular weight of the di-block copolymer was 155,000. Also, The number average molecular weight of the tri-block copolymer was 165,000.

100 parts by weight of the PVC and 100 parts by weight of the block copolymer composition C [PU-HVSIS Compound C] were melt-kneaded with a kneading machine ["Labo Plastomill 20R200", trade name, made by Toyo Seiki Seisaku-sho Ltd] at a temperature of 140° C. and a mill rotation speed of 40 rpm under nitrogen for 5 minutes to give a vinyl chloride polymer composition.

By using the obtained vinyl chloride polymer composition, a molded article [test piece] and a laminate structure were prepared. Then the various properties of the molded article and the adhesion strength in the laminate structure were measured and evaluated according to the above-described methods. Results are shown in the Table 4.

TABLE 4

|  | Examples | |
|---|---|---|
|  | 11 | 12 |
| Composition [Part by weight] | | |
| PVC | 100 | 100 |
| PU-SEEPS Compound B | 100 | |
| PU-HVSIS Compound C | | 100 |
| Properties of the molded article | | |
| Hardness [Shore A] | 93 | 93 |
| Non-tackiness | ○ | ○ |
| Flexibility | ⊚ | ⊚ |
| Mechanical properties | | |
| Yield strength [kgf/cm$^2$] | 123[1] | 96 |
| Elongation at yield point [%] | 150[1] | 180 |
| Non-migration | ○ | ○ |
| Adhesion strength of the laminate structure | Impossible to peel | Impossible to peel |
| Adhesion strength [kgf/cm] | | |

Note:
[1] Tensile strength at break and elongation at break are shown, because the test piece was broken before reaching to the yield point.

From the results shown on the Tables 1 to 4, it is apparent that the vinyl chloride polymer composition of the present invention has non-tackiness and excellent handling properties. It can be also understood that that the vinyl chloride polymer composition of the present invention can give a molded article having excellent mechanical properties and shows high adhesion strength to other materials.

INDUSTRIAL APPLICABILITY

The present provides a vinyl chloride polymer composition which has non-tackiness, excellent handling properties, favorable flexibility and mechanical properties, and favorable melt-adhesiveness to other materials, and shows no migration of the component serving as a plasticizer.

The vinyl chloride polymer composition of the present invention can be applied for various uses such as a production of various molded articles and a production of a laminated structure with other materials.

The invention claimed is:

1. A vinyl chloride polymer composition comprising
   (i) a vinyl chloride polymer (a) and
   (ii) a block copolymer (b) having a polymer block (I) of a block copolymer, which may be hydrogenated, of an aromatic vinyl compound polymer block and a conjugated diene polymer block, and a polymer block (II) of a polyurethane,
   wherein the weight ratio of the vinyl chloride polymer (a) and that of the block copolymer (b) satisfy the following equation (1):

$$30/70 \leq Wa/Wb \leq 98/2 \quad (1)$$

wherein Wa and Wb mean the weights of the vinyl chloride polymer (a) and the block copolymer (b), respectively.

2. The vinyl chloride polymer composition according to claim 1, further comprising a thermoplastic polyurethane (c) in an amount of not more than 1000 parts by weight based on 100 parts by weight of the block copolymer (b).

3. The vinyl chloride polymer composition according to claim 1, further comprising a block copolymer (d), which may be hydrogenated, having an aromatic vinyl compound polymer block and a conjugated diene polymer block, in an amount of not more than 500 parts by weight based on 100 parts by weight of the block copolymer (b).

4. The vinyl chloride polymer composition according to claim 1, further comprising an ethylene-α-olefin copolymer (e),
   wherein the weight ratio of the ethylene-α-olefin copolymer (e) satisfies the following equations (2) and (3):

$$1/100 \leq Wb/(Wa+We) \leq 100/100 \quad (2)$$

$$30/70 \leq Wa/We \leq 95/5 \quad (3)$$

wherein We means the weight of the ethylene-α-olefin copolymer (e).

5. The vinyl chloride polymer composition according to claim 3, further comprising a paraffin oil (f),
   wherein the weights of the block copolymer (d) and the paraffin oil (f) satisfy the following equations (4) to (6):

$$1/100 \leq Wb/(Wa+Wd+Wf) \leq 100/100 \quad (4)$$

$$25/75 \leq Wd/Wf \leq 95/5 \quad (5)$$

$$30/70 \leq Wa/(Wd+Wf) \leq 95/5 \quad (6)$$

wherein Wd and Wf mean the weights of the block copolymer (d), which may be hydrogenated, having an aromatic vinyl compound polymer block and a conjugated diene polymer block and the paraffin oil (f), respectively.

6. A molded article comprising the vinyl chloride polymer composition according to claim 1.

7. A composite article comprising the vinyl chloride polymer composition according to claim 1 and another material.

8. The composite article according to claim 7, wherein another material is a material having a polarity.

9. The vinyl chloride polymer composition of claim 1, wherein the conjugated diene polymer block is hydrogenated.

10. The vinyl chloride polymer composition of claim 1, wherein the vinyl chloride polymer (a) comprises 80% by weight or more of polymerized vinyl chloride units.

11. The vinyl chloride polymer composition according to claim 1, wherein the block copolymer (b) has a di-block structure.

12. The vinyl chloride polymer composition according to claim 1, wherein the conjugated diene block of the polymer block (I) is entirely hydrogenated.

13. The vinyl chloride polymer composition according to claim 1, wherein the conjugated diene polymer block is at least one of a polymer block selected from the group consisting of a polyisoprene block, a polybutadiene block, and a copolymer of isoprene and butadiene.

14. The vinyl chloride polymer composition according to claim 1, wherein the weight ratio of the vinyl chloride polymer (a) and the block copolymer (b) is from 35/65 to 90/10.

15. The vinyl chloride polymer composition according to claim 1, wherein the weight ratio of the vinyl chloride polymer (a) and the block copolymer (b) is from 40/60 to 85/15.

16. The vinyl chloride polymer composition according to claim 2, further comprising a block copolymer (d), which may be hydrogenated, having an aromatic vinyl compound polymer block and a conjugated diene polymer block, in an amount of not more than 500 parts by weight based on 100 parts by weight of the block copolymer (b).

17. A molded article comprising the vinyl chloride polymer composition according to claim 5.

18. A composite article comprising the vinyl chloride polymer composition according to claim 5 and another material.

* * * * *